(12) United States Patent
Onoda

(10) Patent No.: US 7,907,353 B2
(45) Date of Patent: Mar. 15, 2011

(54) IMAGE PICKUP LENS AND IMAGE PICKUP APPARATUS

(75) Inventor: Yoshitomo Onoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/457,360

(22) Filed: Jun. 9, 2009

(65) Prior Publication Data

US 2010/0020418 A1      Jan. 28, 2010

(30) Foreign Application Priority Data

Jul. 23, 2008   (JP) .................................. 2008-189891

(51) Int. Cl.
*G02B 9/34* (2006.01)
(52) U.S. Cl. ...................................................... 359/773
(58) Field of Classification Search .......... 359/754–757, 359/763, 764, 766, 771–773; 369/112.01–112.29
See application file for complete search history.

(56) References Cited

U.S. PATENT DOCUMENTS

| 2005/0046970 A1 | 3/2005 | Amanai |
| 2008/0043343 A1 | 2/2008 | Chen et al. |
| 2008/0266676 A1 * | 10/2008 | Yasuhiko ...................... 359/708 |

FOREIGN PATENT DOCUMENTS

| JP | 05-040220 A | 2/1993 |
| JP | 2002-365529 A | 12/2002 |
| JP | 2004-341512 | 12/2004 |
| JP | 2005-208236 A | 8/2005 |
| JP | 2005-292559 | 10/2005 |
| JP | 2007-155868 | 6/2007 |
| JP | 2007-212878 A | 8/2007 |
| JP | 2008-033376 | 2/2008 |

OTHER PUBLICATIONS

Bellingham+Stanley Technical Bulletin, R007, "Dispersion, light sources and Abbe Number",Mar. 13, 2007, pp. 1-2.*
European Search Report issued Oct. 28, 2009 for corresponding European Application No. 09 25 1471.

* cited by examiner

*Primary Examiner* — Darryl J Collins
(74) *Attorney, Agent, or Firm* — Rader, Fishman & Grauer PLLC

(57) ABSTRACT

An image pickup lens includes: a first lens having a positive refracting power; an aperture stop for adjusting the amount of light; a second lens having a concave face directed to the object side and having a negative refracting power; a third lens having a concave face directed to the object side and having a positive refracting power; and a fourth lens having a negative refracting power; the first lens, aperture stop, second lens, third lens, and fourth lens being disposed in order from the object side.

5 Claims, 19 Drawing Sheets

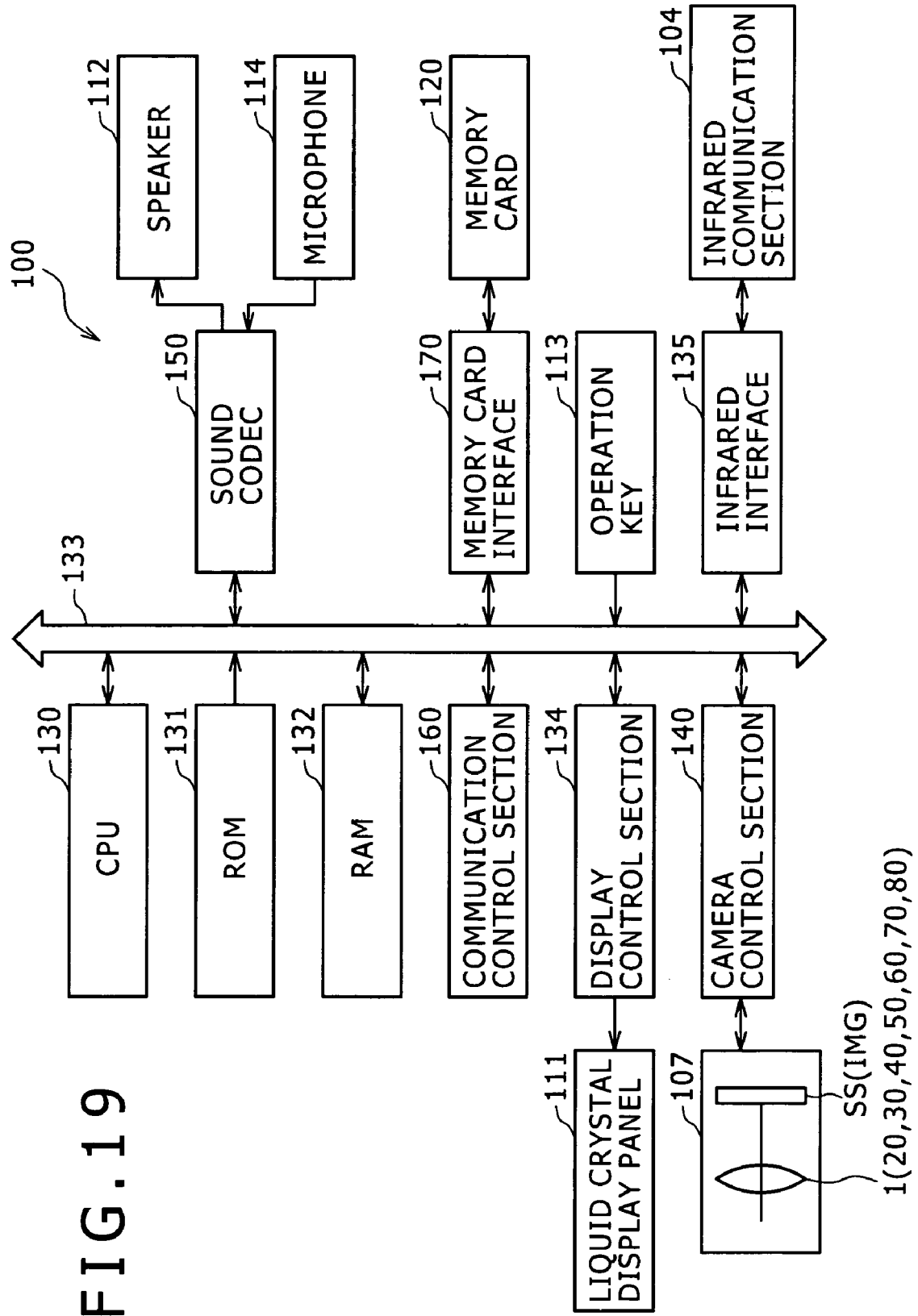

IMAGE PICKUP LENS AND IMAGE PICKUP APPARATUS

BACKGROUND OF THE INVENTION

1. Field of the Invention

This invention relates to an image pickup lens and an image pickup apparatus and can be applied suitably to an image pickup lens ready, for example, for a wide angle of view and a small-sized image pickup apparatus such as a digital still camera or a portable telephone set with a camera in which a solid-state image pickup element such as a CCD (Charge Coupled Device) element or a CMOS (Complementary Metal Oxide Semiconductor) element is incorporated.

2. Description of the Related Art

In related art, a portable telephone set with a camera and a digital still camera which incorporate an image pickup apparatus in which a solid-state image pickup element such as a CCD element or a CMOS element is used are known. For such an image pickup apparatus, further reduction in size is demanded, and also as an image pickup lens incorporated in the image pickup apparatus, an image pickup lens having a reduced size and a reduced overall length is demanded.

Also widening of the angle is simultaneously demanded for the image pickup lens, and an image pickup lens of a reduced focal length is demanded together with a demand for miniaturization.

Further, in recent years, also in a small-sized image pickup apparatus like a portable telephone set with a camera, increase of the number of pixels of an image pickup element is advancing together with miniaturization, and a model which incorporates a high pixel number image pickup element of a megapixel resolution or more has become popularized.

Simultaneously, also widening of the angle of the image pickup lens is demanded, and therefore, also for an image pickup lens for an image pickup apparatus incorporated in small-sized image pickup equipment, a high lens performance ready for such a high pixel number image pickup element is demanded. As such a small-sized high-performance image pickup lens as just described, a demand for an image pickup lens having three or more lenses is increasing. Such an image pickup lens as just described is disclosed, for example, in Japanese Patent Laid-Open No. 2007-155868 (hereinafter referred to as Patent Document 1), Japanese Patent Laid-Open No. 2005-292559 (hereinafter referred to as Patent Document 2), Japanese Patent Laid-Open No. 2004-341512 (hereinafter referred to as Patent Document 3) and Japanese Patent Laid-Open No. 2008-33376 (hereinafter referred to as Patent Document 4).

SUMMARY OF THE INVENTION

Incidentally, while the image pickup lens disclosed in Patent Document 1 requires three lenses, a lens having a high resolution and having minimized chromatic aberrations is demanded together with increase of the number of pixels in an image pickup element in recent years. However, such an image pickup lens having a three-lens configuration as described above has a problem that, against the demand described, the number of lenses is insufficient and the image pickup lens cannot sufficiently correct chromatic aberrations and fails to achieve a required optical performance.

Meanwhile, the image pickup lens disclosed in Patent Document 2 is configured including four lenses and has a high aberration correction function. However, since it has a great overall length, it is not sufficiently reduced in size.

If it is taken into consideration that the refracting power of each component lens increases together with widening of the angle of an image pickup lens, then it is necessary to configure the image pickup lens such that the fabrication sensitivity is lowered. However, since the image pickup lens having the four-lens configuration is configured such that an aperture stop is disposed at the front end of the optical system, the fabrication sensitivity is high in that the aberration variation caused by misalignment between lenses and so forth is great, resulting in a problem that an optical performance of the image pickup lens is lowered as much.

Further, the image pickup lenses of Patent Document 3 and Patent Document 4 are not prepared sufficiently for correction of magnification chromatic aberration and on-axis chromatic aberration and for correction of off-axis aberration. Therefore, the image pickup lenses are not considered appropriate image pickup lenses ready for a high pixel number image pickup element of a megapixel resolution or more. Further, since the focal distance is not short, the image pickup lenses have a problem in that they do not have a wide angle and do not have a sufficiently small overall length.

Therefore, it is demanded to provide a small-sized image pickup lens which has a good optical characteristic ready for a high pixel number image pickup element and an image pickup apparatus which uses the image pickup lens.

According to an embodiment of the present invention, there is provided an image pickup lens including a first lens having a positive refracting power, an aperture stop for adjusting the amount of light, a second lens having a concave face directed to the object side and having a negative refracting power, a third lens having a concave face directed to the object side and having a positive refracting power, and a fourth lens having a negative refracting power, the first lens, aperture stop, second lens, third lens and fourth lens being disposed in order from the object side. The image pickup lens satisfies the following conditional expressions (1) and (2), $$f_2/f < -1.5 \quad (1)$$

$$12 < v_2 < 28 \quad (2)$$

where f is the focal length of the entire lens system, $f_2$ the focal length of the second lens, and $v_2$ the Abbe number at the d-line, whose wavelength is 587.6 nm, of the second lens.

In the image pickup lens, since the aperture stop is disposed between the first and second lenses, the height of a location of the lenses having a high refracting power from the optical axis at which a light flux passes can be set lower than that in an alternative case wherein the aperture stop is disposed at the nearest position to the object side. Consequently, the fabrication sensitivity can be reduced and improvement of an optical performance can be achieved. Further, since the aperture stop is disposed at a position rather forwardly in the optical system so that the exit pupil is positioned forwardly, the overall length of the lens system can be reduced.

In the image pickup lens, since the second lens is shaped so as to be concave on the object side, the incident angle of a light flux to the second lens can be set to a small angle, and consequently, appearance of aberration caused by widening of the angle of the image pickup lens can be suppressed.

The conditional expression (1) defines the ratio between the focal length f of the entire lens system and the focal length $f_2$ of the second lens and restricts the refracting power of the second lens. In the image pickup lens, if the ratio comes out of the defined range of the conditional expression (1), then it becomes difficult to correct off-axis aberrations, particularly comatic aberration, and curvature of field.

In this manner, in the image pickup lens, where the conditional expression (1) is satisfied, not only on-axis aberrations but also aberrations caused by a light flux particularly from the outside of the axis can be corrected efficiently.

Further, in the image pickup lens, in order to achieve reduction of the overall length and widening of the angle of the entire lens system, the power of the second lens is defined as given by the conditional expression (1) so that the fabrication sensitivity of the second lens can be suppressed low to some degree.

The conditional expression (2) defines a condition regarding the Abbe number of the second lens, and by setting the Abbe number so as to be included in the conditional range, magnification chromatic aberration and on-axis chromatic aberration caused by widening of the angle of the image pickup lens are corrected effectively.

In the image pickup lens, if the Abbe number comes out of the upper limit of the conditional expression (2), then the on-axis chromatic aberration and the magnification chromatic aberration become great. On the contrary, if the Abbe number comes out of the lower limit of the conditional expression (2), then the correction is carried out excessively to increase the on-axis chromatic aberration and the magnification chromatic aberration, resulting in failure to maintain a good optical performance.

In this manner, since the image pickup lens satisfies the conditional expressions (1) and (2), it can reduce the overall length of the lens system while appearance of aberrations caused by widening of the angle of the lens with respect to a high pixel number image pickup element of a megapixel resolution or more is suppressed.

Preferably, the image pickup lens satisfies the following conditional expression (3)

$$0.6 < f_3/f < 1.5 \tag{3}$$

where f is the focal length of the entire lens system and $f_3$ is the focal distance of the third lens.

In the image pickup lens, if the focal distance of the third lens comes out of the upper limit of the defined range of the conditional expression (3), then the power of the third lens becomes excessively low, resulting in failure to correct aberration caused by the second lens.

Further, in the image pickup lens, if the focal distance of the third lens comes out of the lower limit of the defined range of the conditional expression (3), then the power of the third lens becomes excessively high. Consequently, also the power of the second lens is raised, and this raises the fabrication sensitivity and makes it impossible to correct comatic aberration, astigmatism, and curvature of field which are caused by the second lens.

In other words, by satisfying the conditional expression (3), the image pickup lens can effectively suppress appearance of aberration without raising the fabrication sensitivity.

Preferably, at least one of the faces of the first and second lenses on the object side and the image side is formed in an aspheric shape, and both of the faces of the third and fourth lenses on the object side and the image side are formed in an aspheric shape.

Where the image pickup lens is configured in this manner, it can effectively correct comatic aberration, curvature of field, or distortion aberration which particularly appears outside the axis.

Preferably, the fourth lens satisfies the following conditional expression (4)

$$v_4 > 50 \tag{4}$$

where $v_4$ is the Abbe number at the d-line, whose wavelength is 587.6 nm, of the fourth lens.

The conditional expression (4) defines the Abbe number of the fourth lens, and if the Abbe number of the fourth lens is equal to or lower than the defined value, then the magnification chromatic aberration cannot be corrected.

In this manner, where the image pickup lens satisfies the conditional expressions (3) and (4), it can effectively suppress appearance of aberration without raising the fabrication sensitivity.

According to another embodiment of the present invention, there is provided an image pickup apparatus including an image pickup lens, and an image pickup element for converting an optical image formed by the image pickup lens into an electric signal, the image pickup lens including a first lens having a positive refracting power, an aperture stop for adjusting the amount of light, a second lens having a concave face directed to the object side and having a negative refracting power, a third lens having a concave face directed to the object side and having a positive refracting power, and a fourth lens having a negative refracting power, the first lens, aperture stop, second lens, third lens and fourth lens being disposed in order from the object side. The image pickup lens satisfies the following conditional expressions (1) and (2), $$f_2/f < -1.5 \tag{1}$$

$$12 < v_2 < 28 \tag{2}$$

where f is the focal length of the entire lens system, $f_2$ the focal length of the second lens, and $v_2$ is the Abbe number at the d-line, whose wavelength is 587.6 nm, of the second lens.

In the image pickup lens of the image pickup apparatus, since the aperture stop is disposed between the first and second lenses, the height of a location of the lenses having a high refracting power from the optical axis at which a light flux passes can be set lower than that in an alternative case wherein the aperture stop is disposed at the nearest position to the object side. Consequently, the fabrication sensitivity can be reduced and improvement of an optical performance can be achieved. Further, since the aperture stop is disposed at a position rather forwardly in the optical system so that the exit pupil is positioned forwardly, the overall length of the lens system can be reduced.

In the image pickup lens of the image pickup apparatus, since the second lens is shaped so as to be concave on the object side, the incident angle of a light flux to the second lens can be set to a small angle, and consequently, appearance of aberrations caused by widening of the angle of the image pickup lens can be suppressed.

The conditional expression (1) defines the ratio between the focal length f of the entire lens system and the focal length $f_2$ of the second lens and restricts the refracting power of the second lens. Accordingly, in the image pickup lens of the image pickup apparatus, if the ratio comes out of the defined range of the conditional expression (1), then it becomes difficult to correct off-axis aberrations, particularly comatic aberration, and curvature of field.

In this manner, in the image pickup lens of the image pickup apparatus, where the conditional expression (1) is satisfied, aberrations caused by a light flux not in the proximity of the axis but particularly from the outside of the axis can be corrected efficiently.

Further, in the image pickup lens of the image pickup apparatus, in order to achieve reduction of the overall length and widening of the angle of the entire lens system, the power of the second lens is defined as given by the conditional expression (1) so that the fabrication sensitivity of the second lens can be suppressed low to some degree.

The conditional expression (2) defines a condition regarding the Abbe number of the second lens, and by setting the Abbe number so as to be included in the conditional range, magnification chromatic aberration and on-axis chromatic aberration caused by widening of the angle of the image pickup lens of the image pickup apparatus are corrected effectively.

In the image pickup lens of the image pickup apparatus, if the Abbe number comes out of the upper limit of the conditional expression (2), then the on-axis chromatic aberration and the magnification chromatic aberration become great. On the contrary, if the Abbe number comes out of the lower limit of the conditional expression (2), then the correction is carried out excessively to increase the on-axis chromatic aberration and the magnification chromatic aberration, resulting in failure to maintain a good optical performance.

In this manner, since the image pickup lens of the image pickup apparatus satisfies the conditional expressions (1) and (2), it can reduce the overall length of the lens system while appearance of aberrations caused by widening of the angle of the lens with respect to a high pixel number image pickup element of a megapixel resolution or more is suppressed.

Accordingly, in the image pickup apparatus, since the aperture stop in the image pickup lens is disposed between the first and second lenses, the fabrication sensitivity can be reduced and improvement of an optical performance can be achieved. Further, the overall length of the lens system can be reduced while suppressing appearance of aberration caused by widening of the angle upon increasing of the pixel number of the image pickup element. Therefore, the image pickup apparatus can be provided with a good optical performance and can be further reduced in size.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 19 is a schematic block diagram showing a circuit configuration of the portable telephone set of FIGS. 17 and 18.

DETAILED DESCRIPTION OF THE PREFERRED EMBODIMENTS

Figure 1:
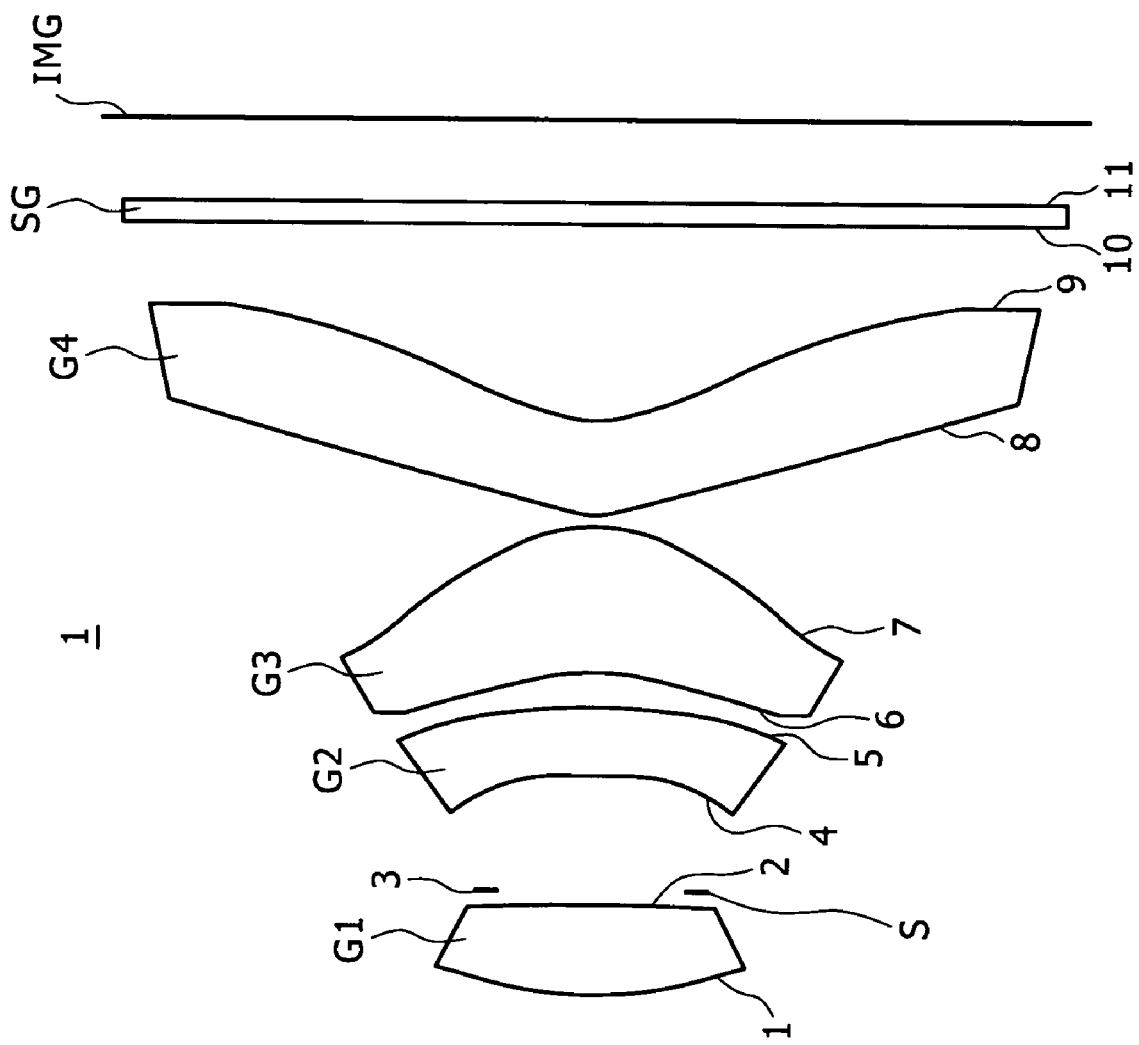
FIG. 1 is a schematic sectional view showing a configuration of an image pickup lens according to a first numerical value example of the present invention.

In the following, an image pickup lens and an image pickup apparatus to which an embodiment of the present invention is applied are described in detail.

[1] Configuration of the Image Pickup Lens

The image pickup lens according to an embodiment of the present invention includes a first lens of a meniscus shape having a convex face directed to the object side and having a positive refracting power, an aperture stop, a second lens having a concave face directed to the object side and having a negative refracting power, a third lens having a concave face directed to the object side and having a positive refracting power, and a fourth lens having a convex face directed to the object side and having a negative refracting power, disposed in order from the object side.

In the image pickup lens, all of the first to fourth lenses are made of plastics. Particularly, the first lens is made of a polyolefin-based or acrylic-based plastic material; the second lens is made of a polycarbonate-based or polyester-based plastic material; the third lens is made of a polyolefin-based or acrylic-based plastic material; and the fourth lens is made of a polyolefin-based or acrylic-based plastic material.

The image pickup lens having such a configuration as described above has a good optical performance ready for a high pixel number image pickup element of a megapixel resolution or more, and the aperture stop is disposed between the first and second lenses without being disposed at the nearest position to the object.

Consequently, the image pickup lens can reduce the fabrication sensitivity in comparison with that in an alternative configuration wherein the aperture stop is disposed at the nearest position to the object because the height of a location of the first and second lenses having a high refracting power from the optical axis at which a light flux passes can be set lower.

Further, in the image pickup lens, since the aperture stop is disposed at a position of the optical system as forward as possible, that is, between the first and second lenses, the exit pupil is positioned rather forwardly. Consequently, the overall length of the lens system can be reduced.

In particular, in the image pickup lens, since the aperture stop is disposed between the first and second lenses, the overall length of the lens system can be minimized while reducing the fabrication sensitivity even if it is a little.

Further, in the image pickup lens, since the second lens has a shape having the concave face directed to the object side, the incident angle of a light flux to the second lens is small, and consequently, appearance of aberrations caused by widening of the angle of the image pickup lens can be suppressed.

Further, the image pickup lens is configured so as to satisfy the following conditional expressions (1) and (2):

$$f_2/f < -1.5 \quad (1)$$

$$12 < v_2 < 28 \quad (2)$$

where
f: the focal length of the entire lens system,
$f_2$: the focal length of the second lens, and
$v_2$: the Abbe number at the d-line (wavelength: 587.6 nm) of the second lens.

The conditional expression (1) defines the ratio between the focal length f of the entire lens system and the focal length $f_2$ of the second lens and restricts the refracting power of the second lens. In the present image pickup lens, if the ratio comes out of the defined range of the conditional expression (1), then it becomes difficult to correct off-axis aberrations, particularly comatic aberration, and curvature of field.

In this manner, in the image pickup lens, where the conditional expression (1) is satisfied, aberrations caused by a light flux not in the proximity of the axis but particularly from the outside of the axis can be corrected efficiently.

Further, in the image pickup lens, in order to achieve reduction of the overall length and widening of the angle of the entire lens system, the power of the second lens is defined as given by the conditional expression (1) to suppress the fabrication sensitivity of the second lens low to some degree.

The conditional expression (2) defines a condition regarding the Abbe number of the second lens, and by setting the Abbe number so as to be included in the conditional range, magnification chromatic aberration and on-axis chromatic aberration caused by widening of the angle of the image pickup lens are corrected effectively.

In the image pickup lens, if the Abbe number comes out of the upper limit of the conditional expression (2), then the on-axis chromatic aberration and the magnification chromatic aberration become great. On the contrary, if the Abbe number comes out of the lower limit of the conditional expression (2), then the correction is carried out excessively to increase the on-axis chromatic aberration and the magnification chromatic aberration, resulting in failure to maintain a good optical performance.

In this manner, since the image pickup lens satisfies the conditional expressions (1) and (2), it can reduce the overall length of the lens system while appearance of aberrations caused by widening of the angle of the lens with respect to a high pixel number image pickup element of a megapixel resolution or more is suppressed.

Further, the image pickup lens is configured so as to satisfy the following conditional expression (3):

$$0.35 < f_3/f < 1.5 \quad (3)$$

where $f_3$ is the focal distance of the third lens.

The conditional expression (3) defines the power, that is, the refracting power, of the third lens. In the image pickup lens, if the focal distance of the third lens comes out of the upper limit of the defined range of the conditional expression (3), then the power of the third lens becomes excessively low, resulting in failure to correct aberration caused by the second lens.

Further, in the image pickup lens, if the focal distance of the third lens comes out of the lower limit of the defined range of the conditional expression (3), then the power of the third lens becomes excessively high. Consequently, also the power of the second lens is raised, and this raises the fabrication sensitivity and makes it impossible to correct comatic aberration, astigmatism, and curvature of field which are caused by the second lens.

In other words, by satisfying the conditional expression (3), the image pickup lens can effectively suppress appearance of aberration without raising the fabrication sensitivity.

Further, the image pickup lens is characterized in that at least one of the faces of the first and second lenses on the object side and the image side has an aspheric shape and both of the faces of the third and fourth lenses on the object side and the image side have an aspheric shape. Consequently, the image pickup lens can effectively correct comatic aberration, curvature of field, or distortion aberration which particularly appears outside the axis.

It is to be noted that, in the image pickup lens, where the opposite faces of the first lens have aspheric shapes, the spherical aberration can be corrected effectively through the first lens. Further, where the opposite faces of the second lens have aspheric shapes, the astigmatism, curvature of field, and comatic aberration can be corrected effectively.

Incidentally, in the image pickup lens, where the opposite faces of the first and second lenses have aspheric shapes, since the difficulty in fabrication increases, preferably only one of the faces on the object side or the image side is formed so as to have an aspheric shape as far as possible.

However, with the image pickup lens, it is ideal to form both faces of the first and second lenses as aspheric faces in order to correct comatic aberration, spherical aberration, astigmatism, curvature of field, and distortion aberration which are caused by widening of the angle of the lens.

Further, the image pickup lens is configured so as to satisfy the following conditional expression (4):

$$v_4 > 50 \quad (4)$$

where $v_4$ is the Abbe number at the d-line (wavelength: 587.6 nm) of the fourth lens.

The conditional expression (4) defines the Abbe number of the fourth lens, and if the Abbe number of the fourth lens is equal to or lower than the defined value, then the magnification chromatic aberration cannot be corrected.

In this manner, the image pickup lens satisfies the conditional expressions (3) and (4) so that it can effectively suppress appearance of aberration without raising the fabrication sensitivity.

Thus, according to an embodiment of the present invention, a small-sized image pickup lens can be configured which has a good optical performance ready for a high pixel number image pickup device of a megapixel resolution or more, exhibits little drop of optical performance caused by widening of the angle of view and is reduced in the entire length of the lens system.

[2] Examples of Numerical Values

Now, several examples of numerical values wherein particular numerical values are applied to the image pickup lens according to an embodiment of the present invention are described with reference to the accompanying drawings and diagrams. It is to be noted that the symbols used in the numerical value examples have the following meanings.

"FNo" is the F number; "f" the focal distance of the entire lens system; "2ω" the total angle of the diagonal angle; "Si" the ith face number as counted from the object side; "Ri" the radius of curvature of the ith face; "di" the on-axis face distance between the ith face and the i+1th face from the object side; "ni" the refractive index at the d-line (wavelength: 587.6 nm) of the ith lens; and "vi" the Abbe number at the d-line (wavelength: 587.6 nm) of the ith lens.

As regards the face number, "ASP" represents that the face is an aspheric face, and as regards the radius of curvature, "∞" represents that the face is a flat face.

In some of the lenses used in the numerical value examples, a lens face is formed in an aspheric shape. Where the depth of the aspheric face is represented by "Z," the height of the aspheric face from the optical axis by "Y," the radius of curvature by "R," the constant of the cone by "K," and the 4th, 6th, 8th, and 10th aspheric coefficients are represented by "A," "B," "C," and "D," respectively, the aspheric shape of the lens face is defined by the following expression (1):

$$Z = \frac{Y^2/R}{1+\sqrt{1-(1+K)(Y/R)^2}} + AY^4 + BY^6 + CY^8 + DY^{10} \quad (1)$$

[2-1] First Numerical Value Example

Referring to FIG. 1, there is shown an image pickup lens according to the first numerical value example. The image pickup lens is generally denoted by 1 and includes four lenses.

The image pickup lens 1 includes a first lens G1 of a meniscus shape having a convex face directed to the object side and having a positive refracting power, an aperture stop S, a second lens G2 having a concave face directed to the object side and having a negative refracting power, a third lens G3 having a concave face directed to the object side and having a positive refracting power, and a fourth lens G4 having a convex face directed to the object side and having a negative refracting power, disposed in order from the object side.

In the image pickup lens 1, all of the first to fourth lenses G1 to G4 are made of plastics. Particularly, the first lens G1 is made of a polyolefin-based or acrylic-based plastic material; the second lens G2 is made of a polycarbonate-based or polyester-based plastic material; the third lens G3 is made of a polyolefin-based or acrylic-based plastic material; and the fourth lens G4 is made of a polyolefin-based or acrylic-based plastic material.

The image pickup lens 1 having such a configuration as described above has a good optical performance ready for a high pixel number image pickup element of a megapixel resolution or more, and the aperture stop S is disposed between the first and second lenses G1 and G2 without being disposed at the nearest position to the object.

Consequently, the image pickup lens 1 can reduce the fabrication sensitivity in comparison with that in an alternative configuration wherein the aperture stop S is disposed at the nearest position to the object because the height of a location of the first and second lenses G1 and G2 having a high refracting power from the optical axis at which a light flux passes can be set lower.

Further, in the image pickup lens 1, since the aperture stop S is disposed at a position of the optical system as forward as possible, that is, between the first and second lenses G1 and G2, the exit pupil is positioned rather forwardly. Consequently, the overall length of the lens system can be reduced.

In particular, in the image pickup lens 1, since the aperture stop S is disposed between the first and second lenses G1 and G2, the overall length of the lens system can be minimized while reducing the fabrication sensitivity even if it is a little.

Further, in the image pickup lens 1, since the second lens G2 has a shape having the concave face directed to the object side, the incident angle of a light flux to the second lens G2 is small, and consequently, appearance of aberrations caused by widening of the angle of the image pickup lens 1 can be suppressed.

It is to be noted that the image pickup lens 1 further includes a seal glass member SG disposed between the fourth lens G4 and an image plane IMG for protecting the image plane IMG.

In this manner, since the image pickup lens 1 has such a lens element configuration as described above, it can reduce the overall length of the lens system while reducing the fabrication sensitivity and can favorably correct various aberrations caused by widening of the angle.

Table 1 indicates lens data where particular numerical values are applied to the image pickup lens 1 of the first numerical value example together with the F number FNo and the focal distance f and the angle 2ω of view of the entire lens system.

TABLE 1

Lens Data of the First Numerical Value Example
FNo = 2.8 f = 3.71 2ω = 73.5°

| Si | Ri | Di | Ndi | vdi |
|---|---|---|---|---|
| 1 (ASP) | 2.084 | 0.48 | 1.523 | 56.0 |
| 2 (ASP) | 19.953 | 0.05 | Air | Air |
| 3 (STOP) | ∞ | 0.70 | Air | Air |
| 4 (ASP) | −2.844 | −0.35 | 1.632 | 23.0 |
| 5 (ASP) | −7.248 | −0.14 | Air | Air |
| 6 (ASP) | −1.840 | −0.54 | 1.523 | 56.0 |
| 7 (ASP) | −0.852 | −1.17 | Air | Air |
| 8 (ASP) | 1.884 | 0.53 | 1.523 | 56.0 |
| 9 (ASP) | 0.824 | 1.21 | Air | Air |
| 10 | ∞ | 0.15 | 1.519 | 64.3 |
| 11 | ∞ | 0.50 | Air | Air |

In the image pickup lens 1, the face R1 of the first lens G1 on the object side, the face R2 of the first lens G1 on the image side, the face R4 of the second lens G2 on the object side, the face R5 of the second lens G2 on the image side, the face R6 of the third lens G3 on the object side, the face R7 of the third lens G3 on the image side, the face R8 of the fourth lens G4 on the object side, and the face R9 of the fourth lens G4 on the image side are formed in aspheric shapes.

The 4th, 6th, 8th, and 10th aspheric coefficients "A," "B," "C," and "D" of the aspheric faces of the image pickup lens 1 in the first numerical value example are indicated in Table 2 together with the constant "K" of the cone. It is to be noted that, in Table 2, "E-01" is an exponential representation with base 10, that is, "$10^{-1}$," and for example, "0.12345E-05" represents "$0.12345 \times 10^{-5}$."

TABLE 2

Aspheric Data in the First Numerical Value Example
FNo = 2.8 f = 3.71 2ω = 73.5°

| Aspheric coefficient | First face | Second face | Fourth face | Fifth face | Sixth face | Seventh face | Eighth face | Ninth face |
|---|---|---|---|---|---|---|---|---|
| K | −1.125 | 0.000 | 0.000 | −8.008 | 0.000 | −3.095 | −4.299 | −4.735 |
| A | 9.327E−04 | −3.964E−02 | −1.719E−01 | −5.335E−02 | 1.674E−01 | −1.005E−01 | −2.200E−02 | −1.563E−02 |
| B | −1.343E−02 | −5.592E−02 | −1.146E−01 | −5.073E−02 | −1.126E−01 | 4.280E−02 | 3.690E−03 | 1.110E−03 |
| C | −1.295E−02 | −5.634E−03 | 1.409E−01 | 4.241E−02 | 5.896E−02 | −1.080E−02 | −2.270E−04 | 1.568E−05 |
| D | −2.099E−02 | 4.700E−03 | −9.012E−02 | −5.576E−03 | −8.893E−03 | 3.563E−03 | 3.590E−06 | −8.772E−06 |

Figure 2:
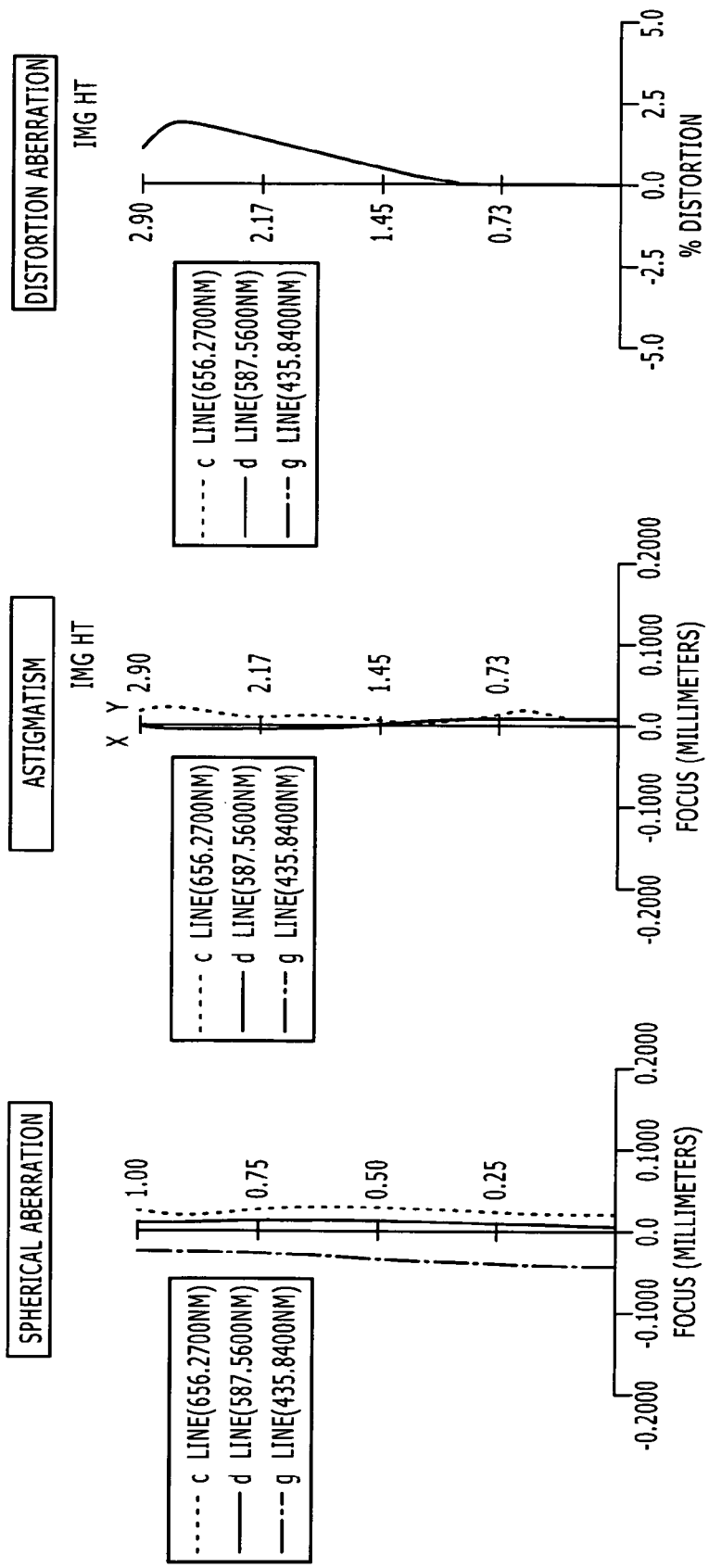
FIG. 2 is a diagrammatic view illustrating characteristic curves of aberrations of the image pickup lens of FIG. 1.

Various aberrations in the image pickup lens 1 of the first numerical value example is illustrated in FIG. 2. Referring to FIG. 2, in the diagram of the astigmatism, a solid line indicates values on a sagittal image plane and a broken line indicates values on a meridional image plane.

From the aberration diagrams shown in FIG. 2 which are a spherical aberration diagram, the astigmatism diagram, and a distortion aberration diagram, it can be recognized that the image pickup lens 1 of the first numerical value example is corrected favorably in the aberrations and has a superior image forming performance.

[2-2] Second Numerical Value Example

Figure 3:
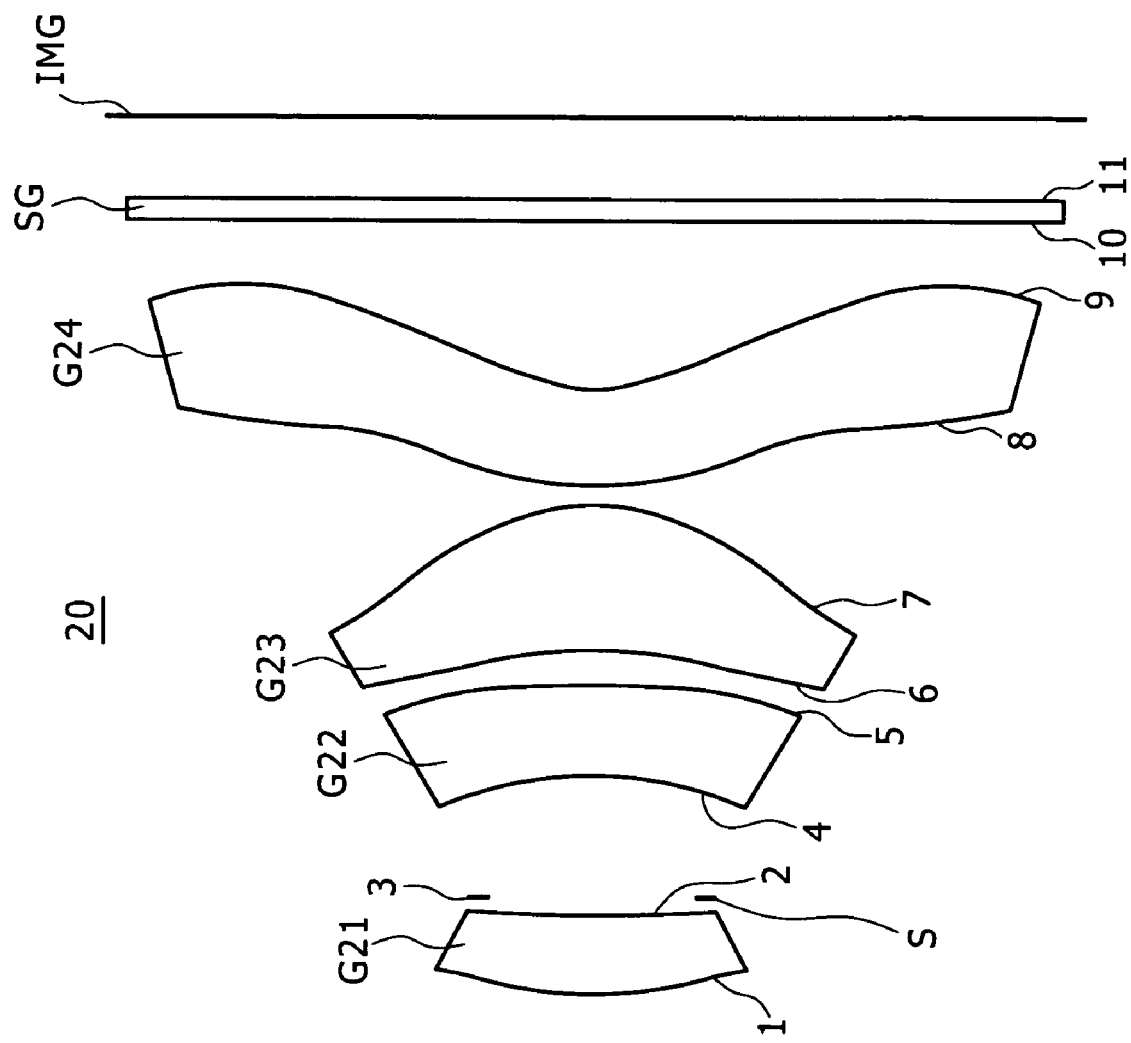
FIG. 3 is a schematic sectional view showing a configuration of an image pickup lens according to a second numerical value example of the present invention.

Referring to FIG. 3, there is shown an image pickup lens according to a second numerical value example and is generally denoted by 20. Also the image pickup lens 20 shown has a configuration having four lenses.

The image pickup lens 20 includes a first lens G21 of a meniscus shape having a convex face directed to the object side and having a positive refracting power, an aperture stop S, a second lens G22 having a concave face directed to the object side and having a negative refracting power, a third lens G23 having a concave face directed to the object side and having a positive refracting power, and a fourth lens G24 having a convex face directed to the object side and having a negative refracting power, disposed in order from the object side.

Also in the image pickup lens 20, all of the first to fourth lenses G21 to G24 are made of plastics. Particularly, the first lens G21 is made of a polyolefin-based or acrylic-based plastic material; the second lens G22 is made of a polycarbonate-based or polyester-based plastic material; the third lens G23 is made of a polyolefin-based or acrylic-based plastic material; and the fourth lens G24 is made of a polyolefin-based or acrylic-based plastic material.

The image pickup lens 20 having such a configuration as described above has a good optical performance ready for a high pixel number image pickup element of a megapixel resolution or more, and the aperture stop S is disposed between the first and second lenses G21 and G22 without being disposed at the nearest position to the object.

Consequently, the image pickup lens 20 can reduce the fabrication sensitivity in comparison with that in an alternative configuration wherein the aperture stop S is disposed at the nearest position to the object because the height of a location of the first and second lenses G21 and G22 having a high refracting power from the optical axis at which a light flux passes can be set lower.

Further, in the image pickup lens 20, since the aperture stop S is disposed at a position of the optical system as forward as possible, that is, between the first and second lenses G21 and G22, the exit pupil is positioned rather forwardly. Consequently, the overall length of the lens system can be reduced.

In particular, in the image pickup lens 20, since the aperture stop S is disposed between the first and second lenses G21 and G22, the overall length of the lens system can be minimized while reducing the fabrication sensitivity even if it is a little.

Further, in the image pickup lens 20, since the second lens G22 has a shape having the concave face directed to the object side, the incident angle of a light flux to the second lens G22 is small, and consequently, appearance of aberrations caused by widening of the angle of the image pickup lens 20 can be suppressed.

It is to be noted that the image pickup lens 20 further includes a seal glass member SG disposed between the fourth lens G24 and an image plane IMG for protecting the image plane IMG.

In this manner, since the image pickup lens 20 has such a lens element configuration as described above, it can reduce the overall length of the lens system while reducing the fabrication sensitivity and can favorably correct various aberrations caused by widening of the angle.

Table 3 indicates lens data where particular numerical values are applied to the image pickup lens 20 of the second numerical value example together with the F number FNo and the focal distance f and the angle 2ω of view of the entire lens system.

TABLE 3

Lens Data of the Second Numerical Value Example
FNo = 2.8 f = 3.71 2ω = 73.6°

| Si | Ri | Di | Ndi | νdi |
|---|---|---|---|---|
| 1 (ASP) | 2.303 | 0.43 | 1.694 | 56.0 |
| 2 (ASP) | 9.600 | 0.10 | Air | Air |
| 3 (STOP) | ∞ | 0.76 | Air | Air |
| 4 (ASP) | −3.482 | −0.29 | 2.002 | 19.4 |
| 5 (ASP) | −4.977 | −0.20 | Air | Air |
| 6 (ASP) | −1.757 | −0.57 | 1.530 | 56.0 |
| 7 (ASP) | −1.065 | −0.94 | Air | Air |
| 8 (ASP) | 1.515 | 0.66 | 1.530 | 56.0 |
| 9 (ASP) | 0.864 | 1.16 | Air | Air |
| 10 | ∞ | 0.15 | 1.519 | 64.3 |
| 11 | ∞ | 0.50 | Air | Air |

In the image pickup lens 20, the face R1 of the first lens G21 on the object side, the face R2 of the first lens G21 on the image side, the face R4 of the second lens G22 on the object side, the face R5 of the second lens G22 on the image side, the face R6 of the third lens G23 on the object side, the face R7 of the third lens G23 on the image side, the face R8 of the fourth lens G24 on the object side, and the face R9 of the fourth lens G24 on the image side are formed in aspheric shapes.

The 4th, 6th, 8th, and 10th aspheric coefficients "A," "B," "C," and "D" of the aspheric faces of the image pickup lens 20 in the second numerical value example are indicated in Table 4 together with the constant "K" of the cone. It is to be noted that, in Table 4, "E-01" is an exponential representation with base 10, that is, "$10^{-1}$," and for example, "0.12345E-05" represents "$0.12345 \times 10^{-5}$."

TABLE 4

Aspheric Data in the Second Numerical Value Example
FNo = 2.8 f = 3.71 2ω = 73.6°

| Aspheric coefficient | Face number | | | | | | | |
|---|---|---|---|---|---|---|---|---|
| | First face | Second face | Fourth face | Fifth face | Sixth face | Seventh face | Eighth face | Ninth face |
| K | −1.238 | 0.000 | 0.000 | −35.333 | 0.000 | −2.873 | −3.758 | −3.649 |
| A | −9.760E−04 | −3.253E−02 | −7.791E−02 | 5.985E−04 | 2.912E−01 | −5.090E−02 | −4.975E−02 | −3.436E−02 |
| B | −1.061E−02 | −3.485E−02 | −7.701E−02 | −7.049E−02 | −2.355E−01 | 2.359E−02 | 8.977E−03 | 5.781E−03 |
| C | −1.178E−02 | −3.347E−03 | 7.796E−02 | 4.045E−02 | 1.031E−01 | −1.497E−02 | −6.672E−04 | −6.876E−04 |
| D | −7.612E−03 | −3.751E−04 | −3.401E−02 | −5.355E−03 | −1.401E−02 | 4.758E−03 | 2.141E−05 | 3.340E−05 |

Figure 4:
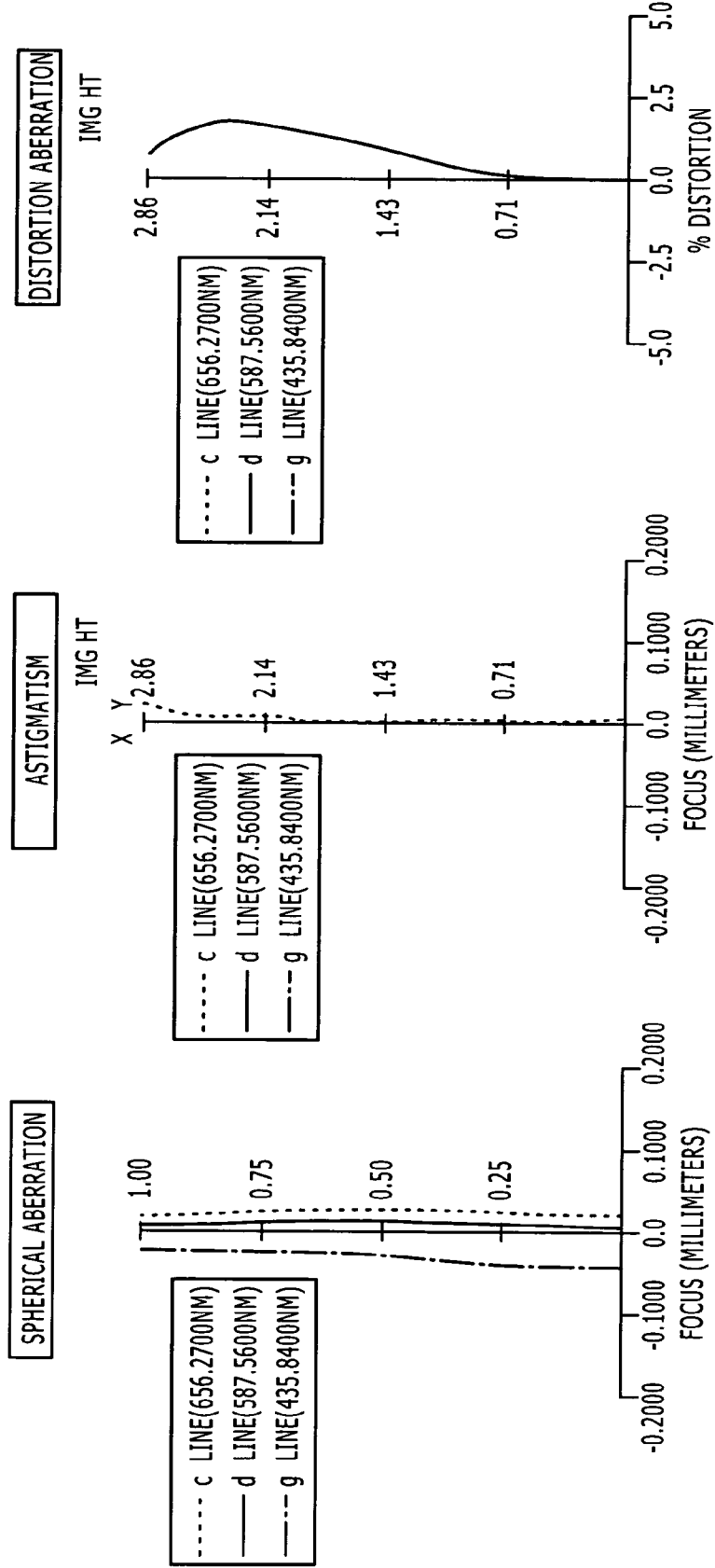
FIG. 4 is a diagrammatic view illustrating characteristic curves of aberrations of the image pickup lens of FIG. 3.

Various aberrations in the image pickup lens 20 of the second numerical value example is illustrated in FIG. 4. Referring to FIG. 4, also in the diagram of the astigmatism, a solid line indicates values on a sagittal image plane and a broken line indicates values on a meridional image plane.

From the aberration diagrams shown in FIG. 4 which are a spherical aberration diagram, the astigmatism diagram and a distortion aberration diagram, it can be recognized that the image pickup lens 20 of the second numerical value example is corrected favorably in the aberrations and has a superior image forming performance.

[2-3] Third Numerical Value Example

Figure 5:
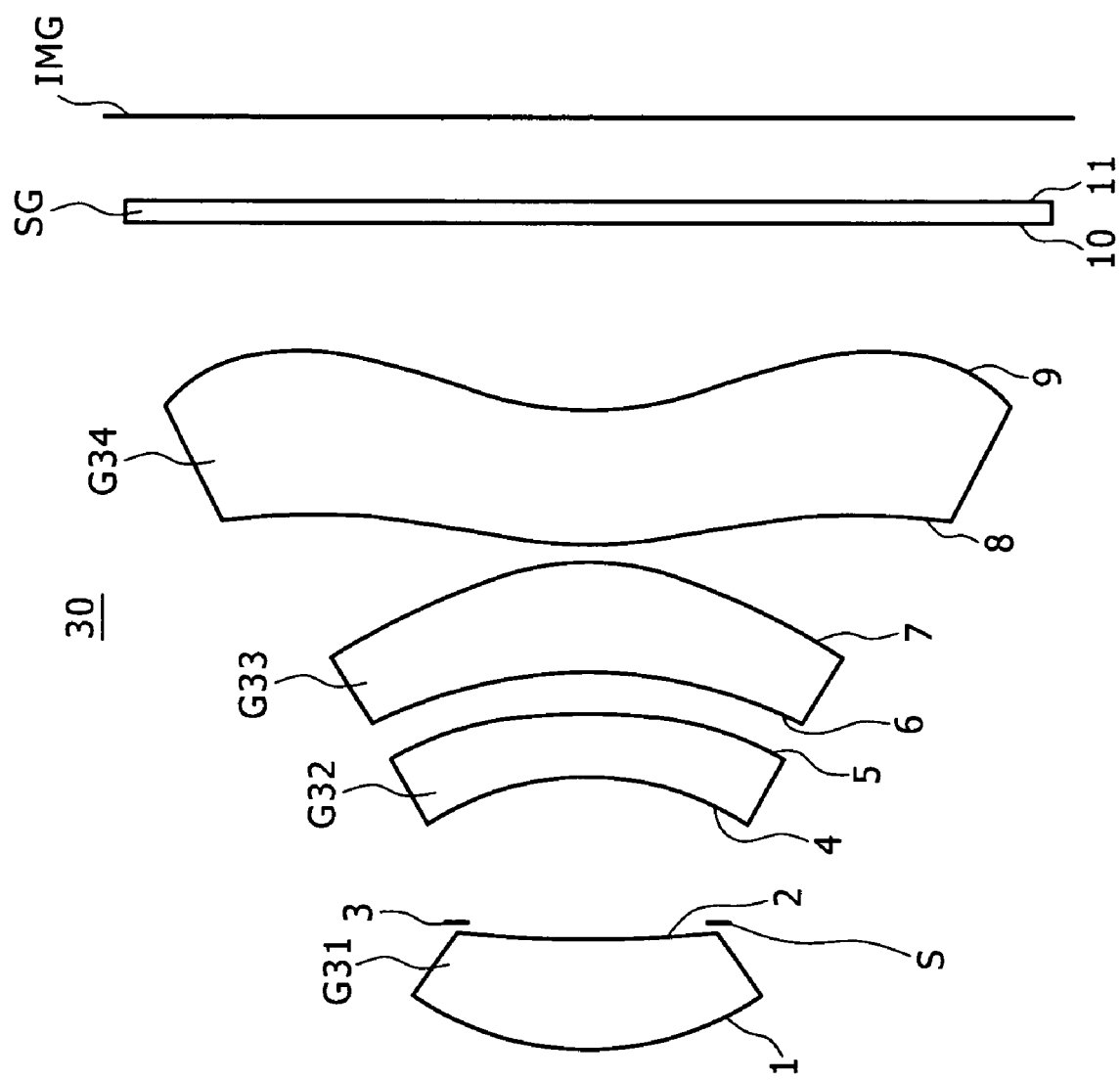
FIG. 5 is a schematic sectional view showing a configuration of an image pickup lens according to a third numerical value example of the present invention.

Referring to FIG. 5, there is shown an image pickup lens according to a third numerical value example and is generally denoted by 30. Also the image pickup lens 30 shown has a configuration having four lenses.

The image pickup lens 30 includes a first lens G31 of a meniscus shape having a convex face directed to the object side and having a positive refracting power, an aperture stop S, a second lens G32 having a concave face directed to the object side and having a negative refracting power, a third lens G33 having a concave face directed to the object side and having a positive refracting power, and a fourth lens G34 having a convex face directed to the object side and having a negative refracting power, disposed in order from the object side.

Also in the image pickup lens 30, all of the first to fourth lenses G31 to G34 are made of plastics. Particularly, the first lens G31 is made of a polyolefin-based or acrylic-based plastic material; the second lens G32 is made of a polycarbonate-based or polyester-based plastic material; the third lens G33 is made of a polyolefin-based or acrylic-based plastic material; and the fourth lens G34 is made of a polyolefin-based or acrylic-based plastic material.

The image pickup lens 30 having such a configuration as described above has a good optical performance ready for a high pixel number image pickup element of a megapixel resolution or more, and the aperture stop S is disposed between the first and second lenses G31 and G32 without being disposed at the nearest position to the object.

Consequently, the image pickup lens 30 can reduce the fabrication sensitivity in comparison with that in an alternative configuration wherein the aperture stop S is disposed at the nearest position to the object because the height of a location of the first and second lenses G31 and G32 having a high refracting power from the optical axis at which a light flux passes can be set lower.

Further, in the image pickup lens 30, since the aperture stop S is disposed at a position of the optical system as forward as possible, that is, between the first and second lenses G31 and G32, the exit pupil is positioned rather forwardly. Consequently, the overall length of the lens system can be reduced.

In particular, in the image pickup lens 30, since the aperture stop S is disposed between the first and second lenses G31 and G32, the overall length of the lens system can be minimized while reducing the fabrication sensitivity even if it is a little.

Further, in the image pickup lens 30, since the second lens G32 has a shape having the concave face directed to the object side, the incident angle of a light flux to the second lens G32 is small, and consequently, appearance of aberrations can be suppressed.

It is to be noted that the image pickup lens 30 further includes a seal glass member SG disposed between the fourth lens G34 and an image plane IMG for protecting the image plane IMG.

In this manner, since the image pickup lens 30 has such a lens element configuration as described above, it can reduce the overall length of the lens system while reducing the fabrication sensitivity and can favorably correct various aberrations caused by widening of the angle.

Table 5 indicates lens data where particular numerical values are applied to the image pickup lens 30 of the third numerical value example together with the F number FNo and the focal distance f and the angle 2ω of view of the entire lens system.

TABLE 5

Lens Data of the Third Numerical Value Example
FNo = 2.8 f = 4.40 2ω = 64.9°

| Si | Ri | Di | Ndi | νdi |
|---|---|---|---|---|
| 1 (ASP) | 1.822 | 0.68 | 1.523 | 56.0 |
| 2 | 7.620 | 0.10 | Air | Air |
| 3 (STOP) | ∞ | 0.88 | Air | Air |
| 4 (ASP) | −2.095 | 0.40 | 1.632 | 23.0 |
| 5 | −2.724 | 0.25 | Air | Air |
| 6 (ASP) | −1.773 | 0.68 | 1.523 | 56.0 |
| 7 (ASP) | −1.217 | 0.10 | Air | Air |
| 8 (ASP) | 2.498 | 0.81 | 1.523 | 56.0 |
| 9 (ASP) | 1.225 | 0.95 | Air | Air |
| 10 | ∞ | 0.15 | 1.519 | 64.3 |
| 11 | ∞ | 0.50 | Air | Air |

In the image pickup lens 30, the face R1 of the first lens G31 on the object side, the face R4 of the second lens G32 on the object side, the face R6 of the third lens G33 on the object side, the face R7 of the third lens G33 on the image side, the face R8 of the fourth lens G34 on the object side and the face R9 of the fourth lens G34 on the image side are formed in aspheric shapes.

On the other hand, in the image pickup lens 30, the face R2 of the first lens G31 on the image side and the face R5 of the second lens G32 on the image side are formed in spherical shapes.

The 4th, 6th, 8th, and 10th aspheric coefficients "A," "B," "C," and "D" of the aspheric faces of the image pickup lens 30 in the third numerical value example are indicated in Table 6 together with the constant "K" of the cone. It is to be noted that, in Table 6, "E-01" is an exponential representation with base 10, that is, "$10^{-1}$," and for example, "0.12345E-05" represents "$0.12345 \times 10^{-5}$."

TABLE 6

Aspheric Data in the Third Numerical Value Example
FNo = 2.8 f = 4.40 2ω = 64.9°

| Aspheric coefficient | Face number | | | | | |
|---|---|---|---|---|---|---|
| | First face | Fourth face | Sixth face | Seventh face | Eighth face | Ninth face |
| K | −0.467 | 0.000 | 0.000 | −3.518 | −3.869 | −6.200 |
| A | 1.301E−02 | −7.702E−02 | 2.220E−01 | 1.276E−03 | −6.370E−02 | −2.918E−02 |
| B | 1.201E−03 | 3.242E−02 | −1.389E−01 | 5.818E−03 | 1.555E−02 | 3.637E−03 |
| C | 4.195E−03 | −8.039E−04 | 4.955E−02 | −8.017E−03 | −2.022E−03 | −3.983E−04 |
| D | −1.992E−03 | −1.615E−02 | −8.534E−03 | 2.317E−03 | 1.101E−04 | 5.799E−06 |

Figure 6:
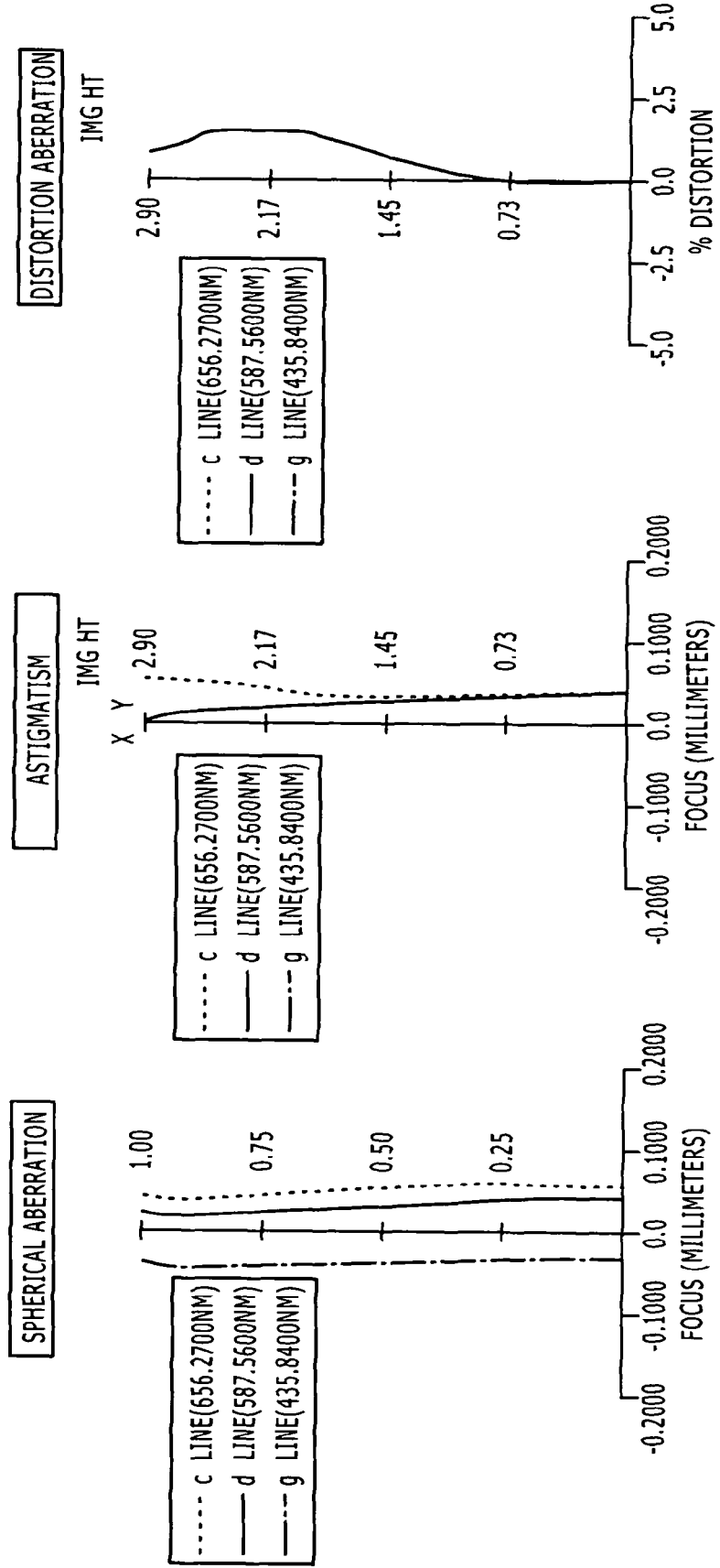
FIG. 6 is a diagrammatic view illustrating characteristic curves of aberrations of the image pickup lens of FIG. 5.

Various aberrations in the image pickup lens 30 of the third numerical value example is illustrated in FIG. 6. Referring to FIG. 6, also in the diagram of the astigmatism, a solid line indicates values on a sagittal image plane and a broken line indicates values on a meridional image plane.

From the aberration diagrams shown in FIG. 6 which are a spherical aberration diagram, the astigmatism diagram and a distortion aberration diagram, it can be recognized that the image pickup lens 30 of the third numerical value example is corrected favorably in the aberrations and has a superior image forming performance.

[2-4] Fourth Numerical Value Example

Figure 7:
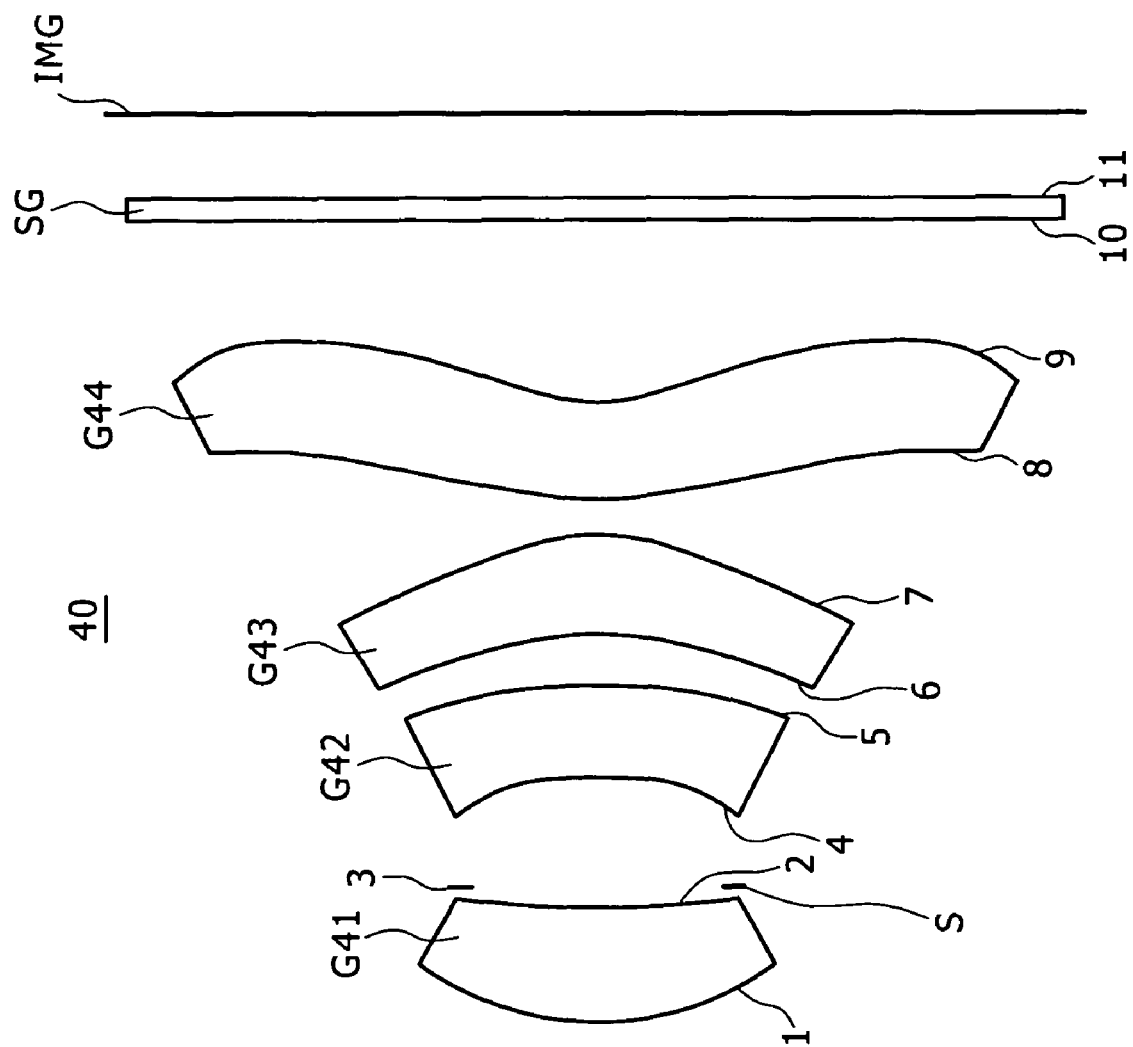
FIG. 7 is a schematic sectional view showing a configuration of an image pickup lens according to a fourth numerical value example of the present invention.

Referring to FIG. 7, there is shown an image pickup lens according to a fourth numerical value example and is generally denoted by 40. Also the image pickup lens 40 shown has a configuration having four lenses.

The image pickup lens 40 includes a first lens G41 of a meniscus shape having a convex face directed to the object side and having a positive refracting power, an aperture stop S, a second lens G42 having a concave face directed to the object side and having a negative refracting power, a third lens G43 having a concave face directed to the object side and having a positive refracting power, and a fourth lens G44 having a convex face directed to the object side and having a negative refracting power, disposed in order from the object side.

Also in the image pickup lens 40, all of the first to fourth lenses G41 to G44 are made of plastics. Particularly, the first lens G41 is made of a polyolefin-based or acrylic-based plastic material; the second lens G42 is made of a polycarbonate-based or polyester-based plastic material; the third lens G43 is made of a polyolefin-based or acrylic-based plastic material; and the fourth lens G44 is made of a polyolefin-based or acrylic-based plastic material.

The image pickup lens 40 having such a configuration as described above has a good optical performance ready for a high pixel number image pickup element of a megapixel resolution or more, and the aperture stop S is disposed between the first and second lenses G41 and G42 without being disposed at the nearest position to the object.

Consequently, the image pickup lens 40 can reduce the fabrication sensitivity in comparison with that in an alternative configuration wherein the aperture stop S is disposed at the nearest position to the object because the height of a location of the first and second lenses G41 and G42 having a high refracting power from the optical axis at which a light flux passes can be set lower.

Further, in the image pickup lens 40, since the aperture stop S is disposed at a position of the optical system as forward as possible, that is, between the first and second lenses G41 and G42, the exit pupil is positioned rather forwardly. Consequently, the overall length of the lens system can be reduced.

In particular, in the image pickup lens 40, since the aperture stop S is disposed between the first and second lenses G41 and G42, the overall length of the lens system can be minimized while reducing the fabrication sensitivity even if it is a little.

Further, in the image pickup lens 40, since the second lens G42 has a shape having the concave face directed to the object side, the incident angle of a light flux to the second lens G42 is small, and consequently, appearance of aberrations caused by widening of the angle of the image pickup lens 40 can be suppressed.

It is to be noted that the image pickup lens 40 further includes a seal glass member SG disposed between the fourth lens G44 and an image plane IMG for protecting the image plane IMG.

In this manner, since the image pickup lens 40 has such a lens element configuration as described above, it can reduce the overall length of the lens system while reducing the fabrication sensitivity and can favorably correct various aberrations caused by widening of the angle.

Table 7 indicates lens data where particular numerical values are applied to the image pickup lens 40 of the fourth numerical value example together with the F number FNo and the focal distance f and the angle 2ω of view of the entire lens system.

TABLE 7

Lens Data of the Fourth Numerical Value Example
FNo = 2.8 f = 4.58 2ω = 62.8°

| Si | Ri | Di | Ndi | νdi |
|---|---|---|---|---|
| 1 (ASP) | 1.676 | 0.72 | 1.523 | 56.0 |
| 2 (ASP) | 7.964 | 0.10 | Air | Air |
| 3 (STOP) | ∞ | 0.68 | Air | Air |
| 4 (ASP) | −1.962 | 0.55 | 1.632 | 23.0 |
| 5 (ASP) | −3.093 | 0.30 | Air | Air |
| 6 (ASP) | −1.709 | 0.60 | 1.523 | 56.0 |
| 7 (ASP) | −1.138 | 0.22 | Air | Air |
| 8 (ASP) | 2.548 | 0.60 | 1.523 | 56.0 |

TABLE 7-continued

Lens Data of the Fourth Numerical Value Example
FNo = 2.8 f = 4.58 2ω = 62.8°

| Si | Ri | Di | Ndi | νdi |
|---|---|---|---|---|
| 9 (ASP) | 1.230 | 1.08 | Air | Air |
| 10 | ∞ | 0.15 | 1.519 | 64.3 |
| 11 | ∞ | 0.50 | Air | Air |

In the image pickup lens 40, the face R1 of the first lens G41 on the object side, the face R2 of the first lens G41 on the image side, the face R4 of the second lens G42 on the object side, the face R5 of the second lens G42 on the image side, the face R6 of the third lens G43 on the object side, the face R7 of the third lens G43 on the image side, the face R8 of the fourth lens G44 on the object side, and the face R9 of the fourth lens G44 on the image side are formed in aspheric shapes.

The 4th, 6th, 8th, and 10th aspheric coefficients "A," "B," "C," and "D" of the aspheric faces of the image pickup lens 40 in the fourth numerical value example are indicated in Table 8 together with the constant "K" of the cone. It is to be noted that, in Table 8, "E-01" is an exponential representation with base 10, that is, "$10^{-1}$," and for example, "0.12345E-05" represents "$0.12345 \times 10^{-5}$."

TABLE 8

Aspheric Data in the Fourth Numerical Value Example
FNo = 2.8 f = 4.58 2ω = 62.8°

| Aspheric coefficient | Face number | | | | | | | |
|---|---|---|---|---|---|---|---|---|
| | First face | Second face | Fourth face | Fifth face | Sixth face | Seventh face | Eighth face | Ninth face |
| K | −0.642 | 0.000 | 0.000 | −2.081 | 0.000 | −3.625 | −3.407 | −6.487 |
| A | 1.915E−02 | −2.344E−02 | −8.476E−02 | −7.641E−03 | 2.099E−01 | 2.466E−03 | −5.875E−02 | −3.087E−02 |
| B | −1.433E−02 | 1.947E−02 | −7.258E−02 | −8.185E−02 | −1.678E−01 | 1.837E−02 | 1.805E−02 | 4.193E−03 |
| C | 2.979E−02 | −8.781E−02 | 8.566E−02 | 5.629E−02 | 7.293E−02 | −9.090E−03 | −2.630E−03 | −2.250E−04 |
| D | −2.564E−02 | 4.397E−02 | −3.422E−02 | 3.072E−03 | −7.628E−03 | 1.515E−03 | 1.307E−04 | −2.388E−05 |

Figure 8:
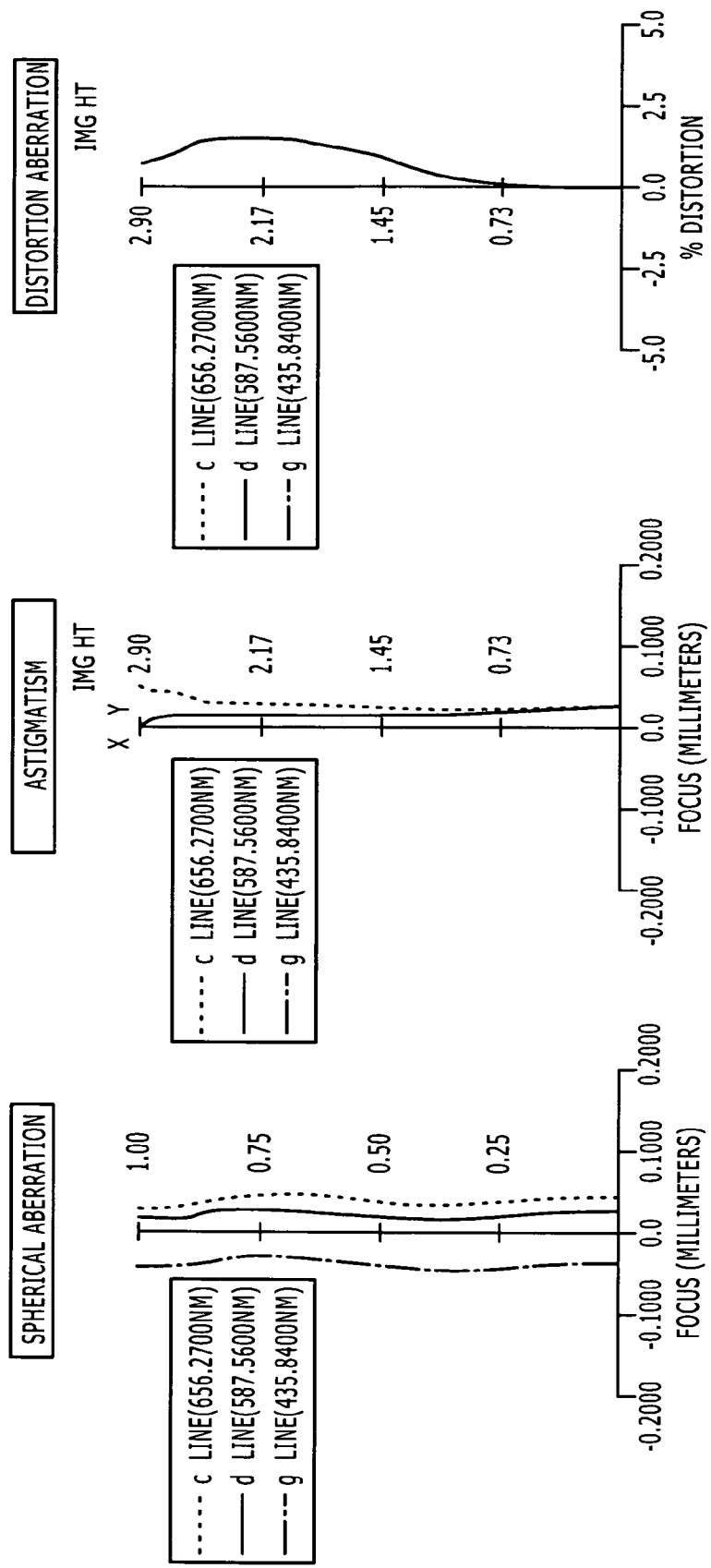
FIG. 8 is a diagrammatic view illustrating characteristic curves of aberrations of the image pickup lens of FIG. 7.

Various aberrations in the image pickup lens 40 of the fourth numerical value example is illustrated in FIG. 8. Referring to FIG. 8, also in the diagram of the astigmatism, a solid line indicates values on a sagittal image plane and a broken line indicates values on a meridional image plane.

From the aberration diagrams shown in FIG. 8 which are a spherical aberration diagram, the astigmatism diagram, and a distortion aberration diagram, it can be recognized that the image pickup lens 40 of the fourth numerical value example is corrected favorably in the aberrations and has a superior image forming performance.

[2-5] Fifth Numerical Value Example

Figure 9:
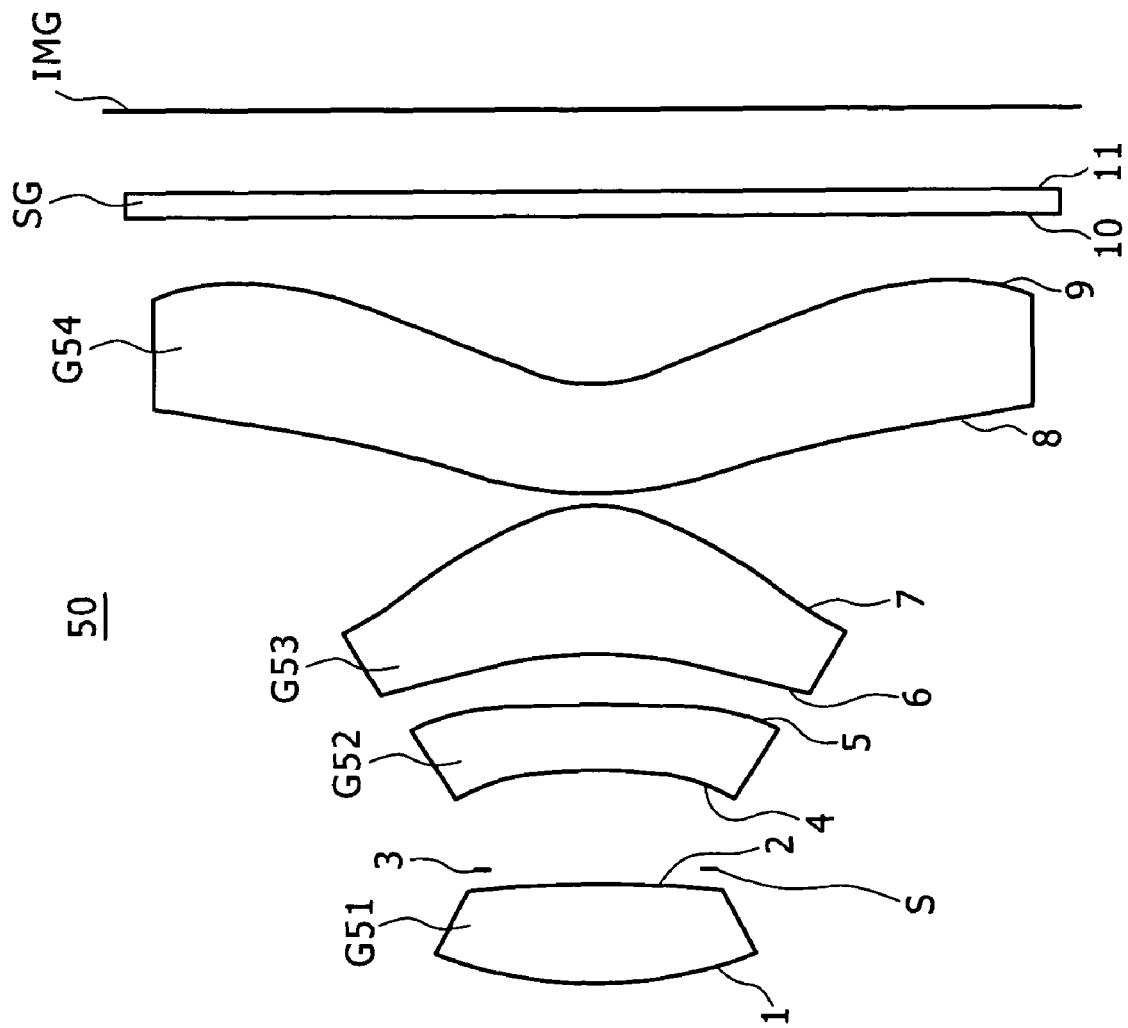
FIG. 9 is a schematic sectional view showing a configuration of an image pickup lens according to a fifth numerical value example of the present invention.

Referring to FIG. 9, there is shown an image pickup lens according to a fifth numerical value example and is generally denoted by 50. Also the image pickup lens 50 shown has a configuration having four lenses.

The image pickup lens 50 includes a first lens G51 of a meniscus shape having a convex face directed to the object side and having a positive refracting power, an aperture stop S, a second lens G52 having a concave face directed to the object side and having a negative refracting power, a third lens G53 having a concave face directed to the object side and having a positive refracting power, and a fourth lens G54 having a convex face directed to the object side and having a negative refracting power, disposed in order from the object side.

Also in the image pickup lens 50, all of the first to fourth lenses G51 to G54 are made of plastics. Particularly, the first lens G51 is made of a polyolefin-based or acrylic-based plastic material; the second lens G52 is made of a polycarbonate-based or polyester-based plastic material; the third lens G53 is made of a polyolefin-based or acrylic-based plastic material; and the fourth lens G54 is made of a polyolefin-based or acrylic-based plastic material.

The image pickup lens 50 having such a configuration as described above has a good optical performance ready for a high pixel number image pickup element of a megapixel resolution or more, and the aperture stop S is disposed between the first and second lenses G51 and G52 without being disposed at the nearest position to the object.

Consequently, the image pickup lens 50 can reduce the fabrication sensitivity in comparison with that in an alternative configuration wherein the aperture stop S is disposed at the nearest position to the object because the height of a location of the first and second lenses G51 and G52 having a high refracting power from the optical axis at which a light flux passes can be set lower.

Further, in the image pickup lens 50, since the aperture stop S is disposed at a position of the optical system as forward as possible, that is, between the first and second lenses G51 and G52, the exit pupil is positioned rather forwardly. Consequently, the overall length of the lens system can be reduced.

In particular, in the image pickup lens 50, since the aperture stop S is disposed between the first and second lenses G51 and G52, the overall length of the lens system can be minimized while reducing the fabrication sensitivity even if it is a little.

Further, in the image pickup lens 50, since the second lens G52 has a shape having the concave face directed to the object side, the incident angle of a light flux to the second lens G52 is small, and consequently, appearance of aberrations caused by widening of the angle of the image pickup lens 50 can be suppressed.

It is to be noted that the image pickup lens 50 further includes a seal glass member SG disposed between the fourth lens G54 and an image plane IMG for protecting the image plane IMG.

In this manner, since the image pickup lens 50 has such a lens element configuration as described above, it can reduce the overall length of the lens system while reducing the fabrication sensitivity and can favorably correct various aberrations caused by widening of the angle.

Table 9 indicates lens data where particular numerical values are applied to the image pickup lens 50 of the fifth numerical value example together with the F number FNo and the focal distance f and the angle 2ω of view of the entire lens system.

TABLE 9

Lens Data of the Fifth Numerical Value Example
FNo = 2.8 f = 4.58 2ω = 62.8°

| Si | Ri | Di | Ndi | vdi |
|---|---|---|---|---|
| 1 (ASP) | 2.225 | 0.60 | 1.523 | 56.0 |
| 2 (ASP) | 64.006 | 0.10 | Air | Air |
| 3 (STOP) | ∞ | 0.62 | Air | Air |
| 4 (ASP) | −3.381 | 0.40 | 1.607 | 27.0 |
| 5 (ASP) | −8.401 | 0.30 | Air | Air |
| 6 (ASP) | −1.800 | 0.90 | 1.523 | 56.0 |
| 7 (ASP) | −0.956 | 0.10 | Air | Air |
| 8 (ASP) | 1.903 | 0.68 | 1.523 | 56.0 |
| 9 (ASP) | 0.893 | 1.01 | Air | Air |
| 10 | ∞ | 0.15 | 1.519 | 64.3 |
| 11 | ∞ | 0.50 | Air | Air |

In the image pickup lens 50, the face R1 of the first lens G51 on the object side, the face R2 of the first lens G51 on the image side, the face R4 of the second lens G52 on the object side, the face R5 of the second lens G52 on the image side, the face R6 of the third lens G53 on the object side, the face R7 of the third lens G53 on the image side, the face R8 of the fourth lens G54 on the object side, and the face R9 of the fourth lens G54 on the image side are formed in aspheric shapes.

The 4th, 6th, 8th, and 10th aspheric coefficients "A," "B," "C," and "D" of the aspheric faces of the image pickup lens 50 in the fifth numerical value example are indicated in Table 10 together with the constant "K" of the cone. It is to be noted that, in Table 10, "E-01" is an exponential representation with base 10, that is, "$10^{-1}$," and for example, "0.12345E−05" represents "$0.12345 \times 10^{-5}$."

TABLE 10

Aspheric Data in the Fifth Numerical Value Example
FNo = 2.8 f = 4.58 2ω = 62.8°

| Aspheric coefficient | First face | Second face | Fourth face | Fifth face | Sixth face | Seventh face | Eighth face | Ninth face |
|---|---|---|---|---|---|---|---|---|
| K | −0.613 | 0.000 | 0.000 | 0.000 | 0.000 | −2.960 | −3.467 | −4.603 |
| A | −8.871E−03 | −3.677E−02 | −1.105E−01 | 2.135E−02 | 2.421E−01 | −5.930E−02 | −4.257E−02 | −1.939E−02 |
| B | −7.528E−03 | −5.894E−02 | −2.214E−01 | −1.431E−01 | −1.804E−01 | 2.117E−02 | 8.706E−03 | 1.257E−03 |
| C | −1.726E−02 | 3.208E−03 | 3.349E−01 | 1.062E−01 | 7.761E−02 | −6.659E−03 | −8.350E−04 | −8.306E−06 |
| D | −1.140E−02 | 9.107E−03 | −2.107E−01 | −2.750E−02 | −1.061E−02 | 2.998E−03 | 3.158E−05 | −8.038E−06 |

Figure 10:
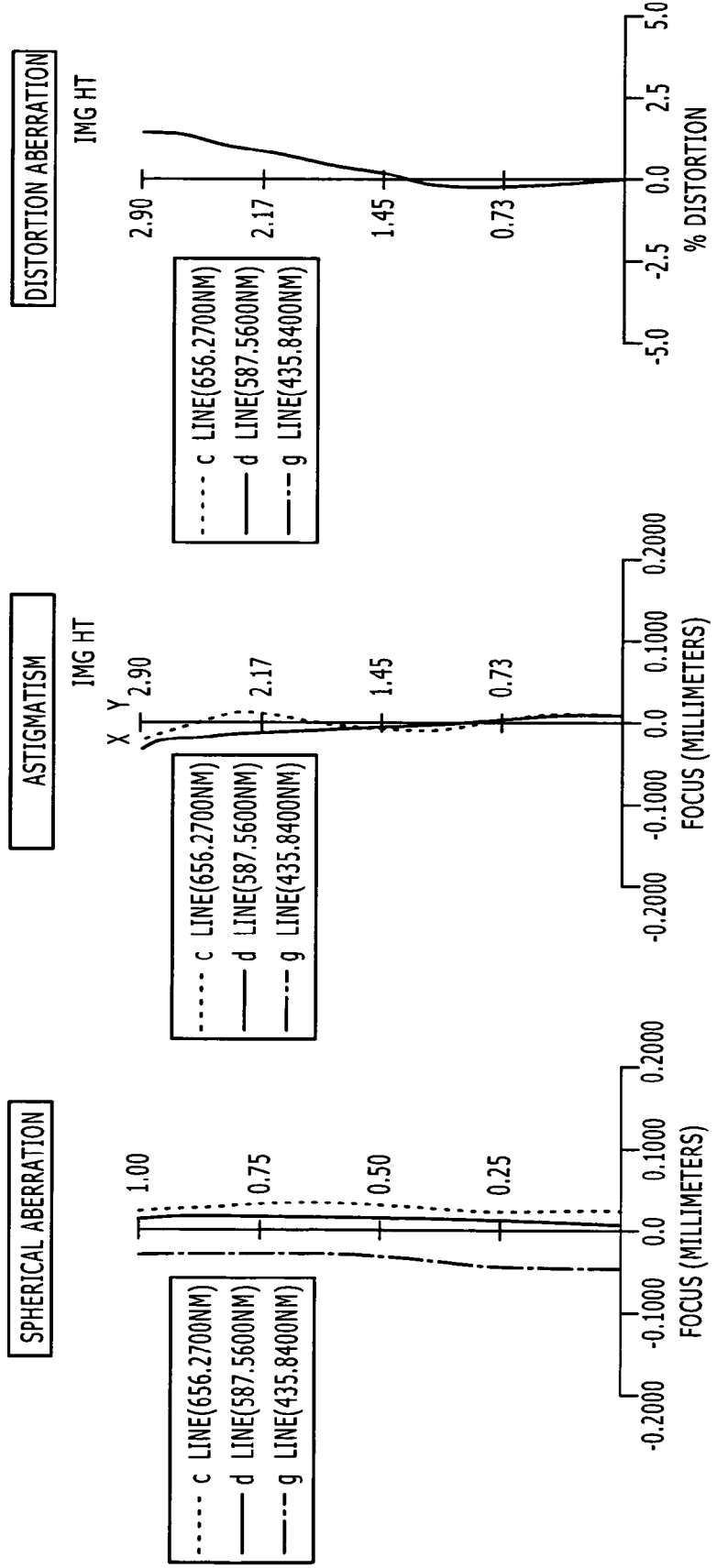
FIG. 10 is a diagrammatic view illustrating characteristic curves of aberrations of the image pickup lens of FIG. 9.

Various aberrations in the image pickup lens 50 of the fifth numerical value example is illustrated in FIG. 10. Referring to FIG. 10, also in the diagram of the astigmatism, a solid line indicates values on a sagittal image plane and a broken line indicates values on a meridional image plane.

From the aberration diagrams shown in FIG. 10 which are a spherical aberration diagram, the astigmatism diagram, and a distortion aberration diagram, it can be recognized that the image pickup lens 50 of the fifth numerical value example is corrected favorably in the aberrations and has a superior image forming performance.

[2-6] Sixth Numerical Value Example

Figure 11:
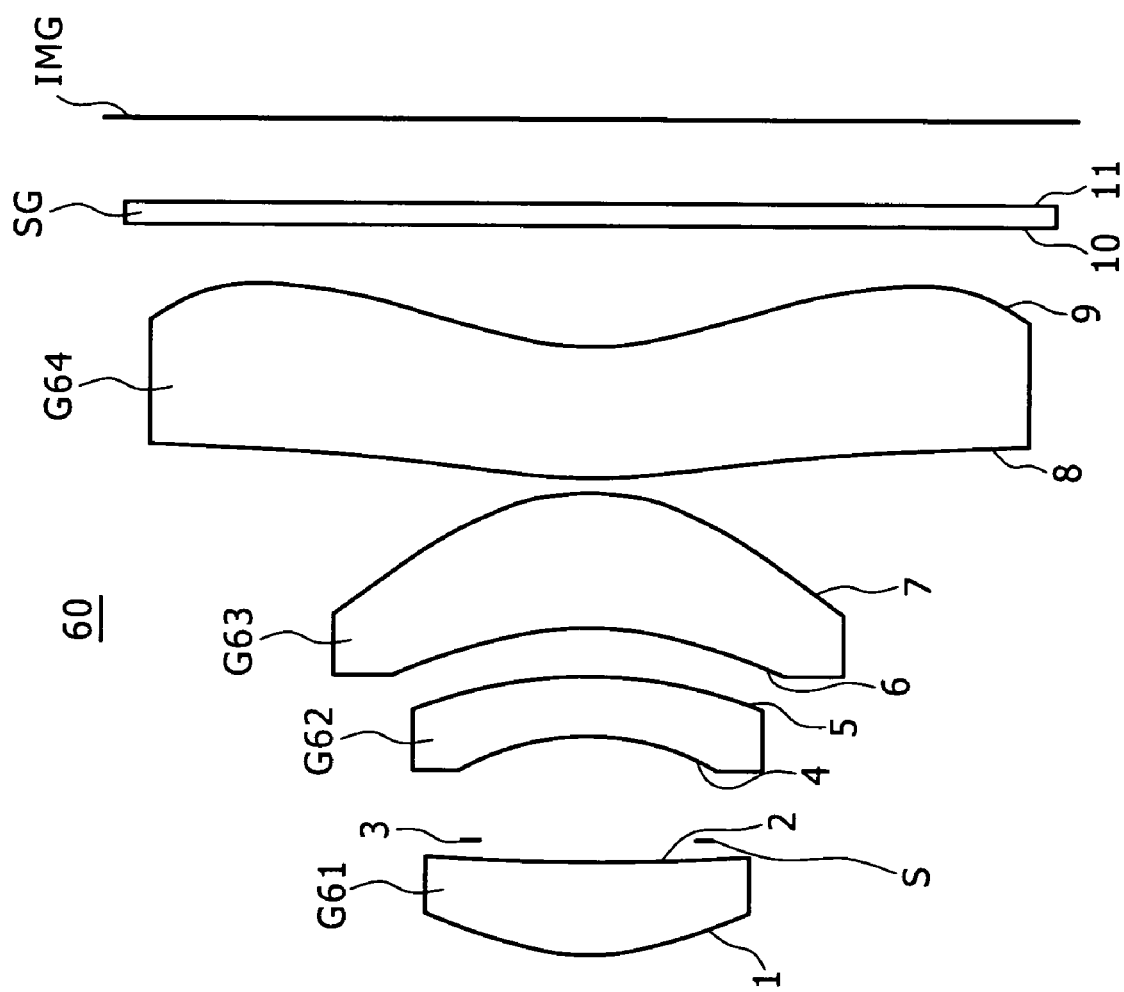
FIG. 11 is a schematic sectional view showing a configuration of an image pickup lens according to a sixth numerical value example of the present invention.

Referring to FIG. 11, there is shown an image pickup lens according to a sixth numerical value example and is generally denoted by 60. Also the image pickup lens 60 shown has a configuration having four lenses.

The image pickup lens 60 includes a first lens G61 of a meniscus shape having a convex face directed to the object side and having a positive refracting power, an aperture stop S, a second lens G62 having a concave face directed to the object side and having a negative refracting power, a third lens G63 having a concave face directed to the object side and having a positive refracting power, and a fourth lens G64 having a convex face directed to the object side and having a negative refracting power, disposed in order from the object side.

Also in the image pickup lens 60, all of the first to fourth lenses G61 to G64 are made of plastics. Particularly, the first lens G61 is made of a polyolefin-based or acrylic-based plastic material; the second lens G62 is made of a polycarbonate-based or polyester-based plastic material; the third lens G63 is made of a polyolefin-based or acrylic-based plastic material; and the fourth lens G64 is made of a polyolefin-based or acrylic-based plastic material.

The image pickup lens 60 having such a configuration as described above has a good optical performance ready for a high pixel number image pickup element of a megapixel resolution or more, and the aperture stop S is disposed between the first and second lenses G61 and G62 without being disposed at the nearest position to the object.

Consequently, the image pickup lens 60 can reduce the fabrication sensitivity in comparison with that in an alternative configuration wherein the aperture stop S is disposed at the nearest position to the object because the height of a location of the first and second lenses G61 and G62 having a high refracting power from the optical axis at which a light flux passes can be set lower.

Further, in the image pickup lens 60, since the aperture stop S is disposed at a position of the optical system as forward as possible, that is, between the first and second lenses G61 and G62, the exit pupil is positioned rather forwardly. Consequently, the overall length of the lens system can be reduced.

In particular, in the image pickup lens 60, since the aperture stop S is disposed between the first and second lens G61 and G62, the overall length of the lens system can be minimized while reducing the fabrication sensitivity even if it is a little.

Further, in the image pickup lens 60, since the second lens G62 has a shape having the concave face directed to the object side, the incident angle of a light flux to the second lens G62 is small, and consequently, appearance of aberrations caused by widening of the angle of the image pickup lens 60 can be suppressed.

It is to be noted that the image pickup lens 60 further includes a seal glass member SG disposed between the fourth lens G64 and an image plane IMG for protecting the image plane IMG.

In this manner, since the image pickup lens 60 has such a lens element configuration as described above, it can reduce the overall length of the lens system while reducing the fabrication sensitivity and can favorably correct various aberrations caused by widening of the angle.

Table 11 indicates lens data where particular numerical values are applied to the image pickup lens 60 of the sixth numerical value example together with the F number FNo and the focal distance f and the angle 2ω of view of the entire lens system.

TABLE 11

Lens Data of the Sixth Numerical Value Example
FNo = 2.85 f = 4.01 2ω = 70.4°

| Si Face number | Ri Radius of curvature | Di Distance | Ndi Refractive index | Ndi Abbe number |
|---|---|---|---|---|
| 1 (ASP) | 1.822 | 0.64 | 1.523 | 56.0 |
| 2 (ASP) | 14.234 | 0.10 | Air | Air |
| 3 (STOP) | ∞ | 0.67 | Air | Air |
| 4 (ASP) | −1.551 | 0.45 | 1.632 | 23.0 |
| 5 (ASP) | −1.726 | 0.30 | Air | Air |
| 6 (ASP) | −1.530 | 0.88 | 1.523 | 56.0 |
| 7 (ASP) | −1.072 | 0.10 | Air | Air |
| 8 (ASP) | 3.221 | 0.79 | 1.523 | 56.0 |
| 9 (ASP) | 1.169 | 0.83 | Air | Air |
| 10 | ∞ | 0.15 | 1.519 | 64.3 |
| 11 | ∞ | 0.50 | Air | Air |

In the image pickup lens 60, the face R1 of the first lens G61 on the object side, the face R2 of the first lens G61 on the image side, the face R4 of the second lens G62 on the object side, the face R5 of the second lens G62 on the image side, the face R6 of the third lens G63 on the object side, the face R7 of the third lens G63 on the image side, the face R8 of the fourth lens G64 on the object side, and the face R9 of the fourth lens G64 on the image side are formed in aspheric shapes.

The 4th, 6th, 8th, and 10th aspheric coefficients "A," "B," "C," and "D" of the aspheric faces of the image pickup lens 60 in the sixth numerical value example are indicated in Table 12 together with the constant "K" of the cone. It is to be noted that, in Table 12, "E-01" is an exponential representation with base 10, that is, "$10^{-1}$," and for example, "0.12345E-05" represents "$0.12345 \times 10^{-5}$."

TABLE 12

Aspheric Data in the Sixth Numerical Value Example
FNo = 2.85 f = 4.01 2ω = 70.4°

| Aspheric coefficient | Face number | | | | | | | |
|---|---|---|---|---|---|---|---|---|
| | First Face | Second face | Fourth face | Fifth face | Sixth face | Seventh face | Eighth face | Ninth face |
| K | −1.136 | 0.000 | 0.000 | −5.395 | 0.000 | −2.941 | −3.943 | −5.635 |
| A | 2.344E−02 | −1.639E−02 | 5.057E−02 | 7.000E−02 | 2.790E−01 | −4.595E−02 | −6.297E−02 | −2.923E−02 |
| B | −7.808E−03 | −2.024E−02 | −1.744E−01 | −7.947E−02 | −1.733E−01 | 2.451E−02 | 1.643E−02 | 4.378E−03 |
| C | 9.113E−03 | −4.191E−02 | 2.957E−01 | 6.300E−02 | 7.149E−02 | −1.466E−02 | −1.937E−03 | −5.263E−04 |
| D | −2.026E−02 | 2.956E−02 | −2.366E−01 | −2.286E−02 | −1.060E−02 | 3.872E−03 | 8.794E−05 | 1.837E−05 |

Figure 12:
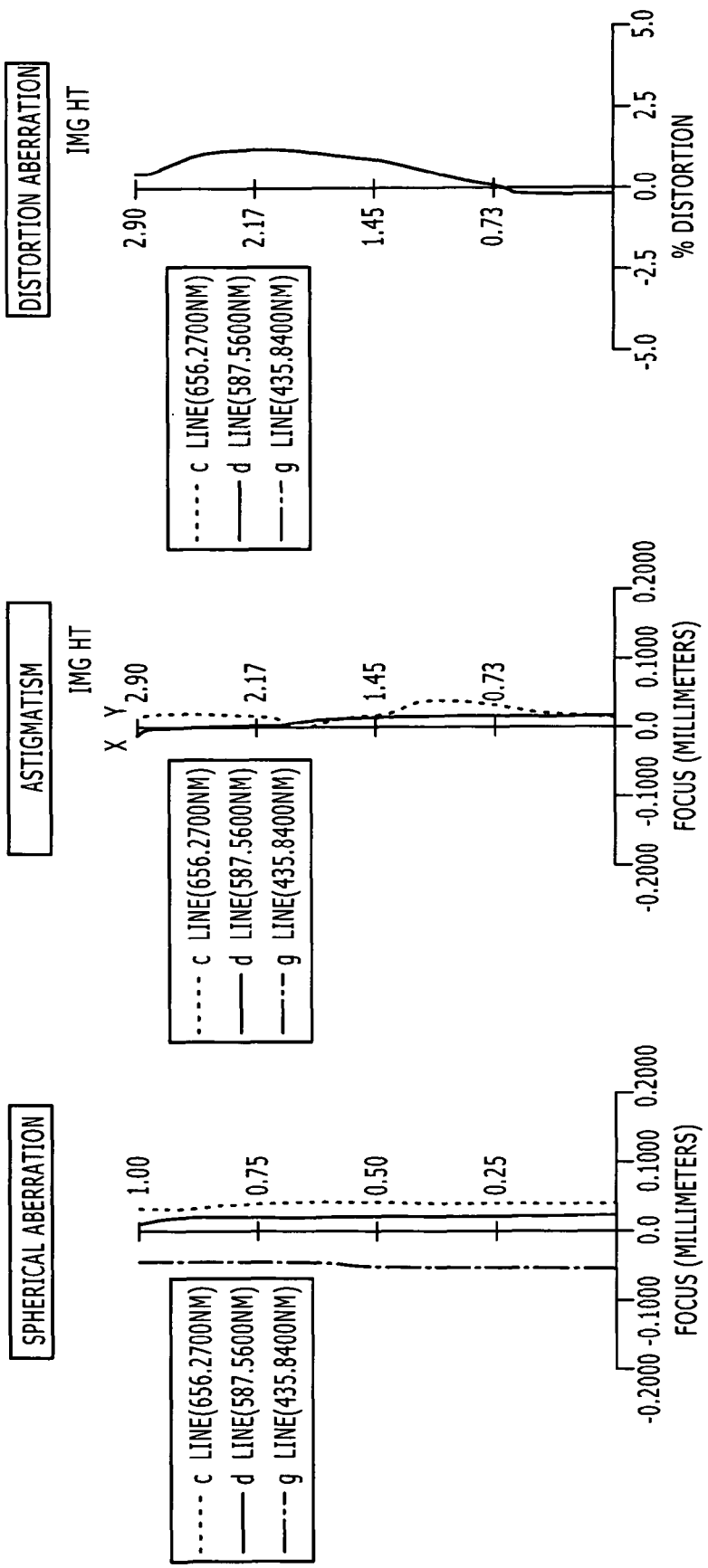
FIG. 12 is a diagrammatic view illustrating characteristic curves of aberrations of the image pickup lens of FIG. 11.

Various aberrations in the image pickup lens 60 of the sixth numerical value example is illustrated in FIG. 12. Referring to FIG. 12, also in the diagram of the astigmatism, a solid line indicates values on a sagittal image plane and a broken line indicates values on a meridional image plane.

From the aberration diagrams shown in FIG. 12 which are a spherical aberration diagram, the astigmatism diagram, and a distortion aberration diagram, it can be recognized that the image pickup lens 60 of the sixth numerical value example is corrected favorably in the aberrations and has a superior image forming performance.

[2-7] Seventh Numerical Value Example

Figure 13:
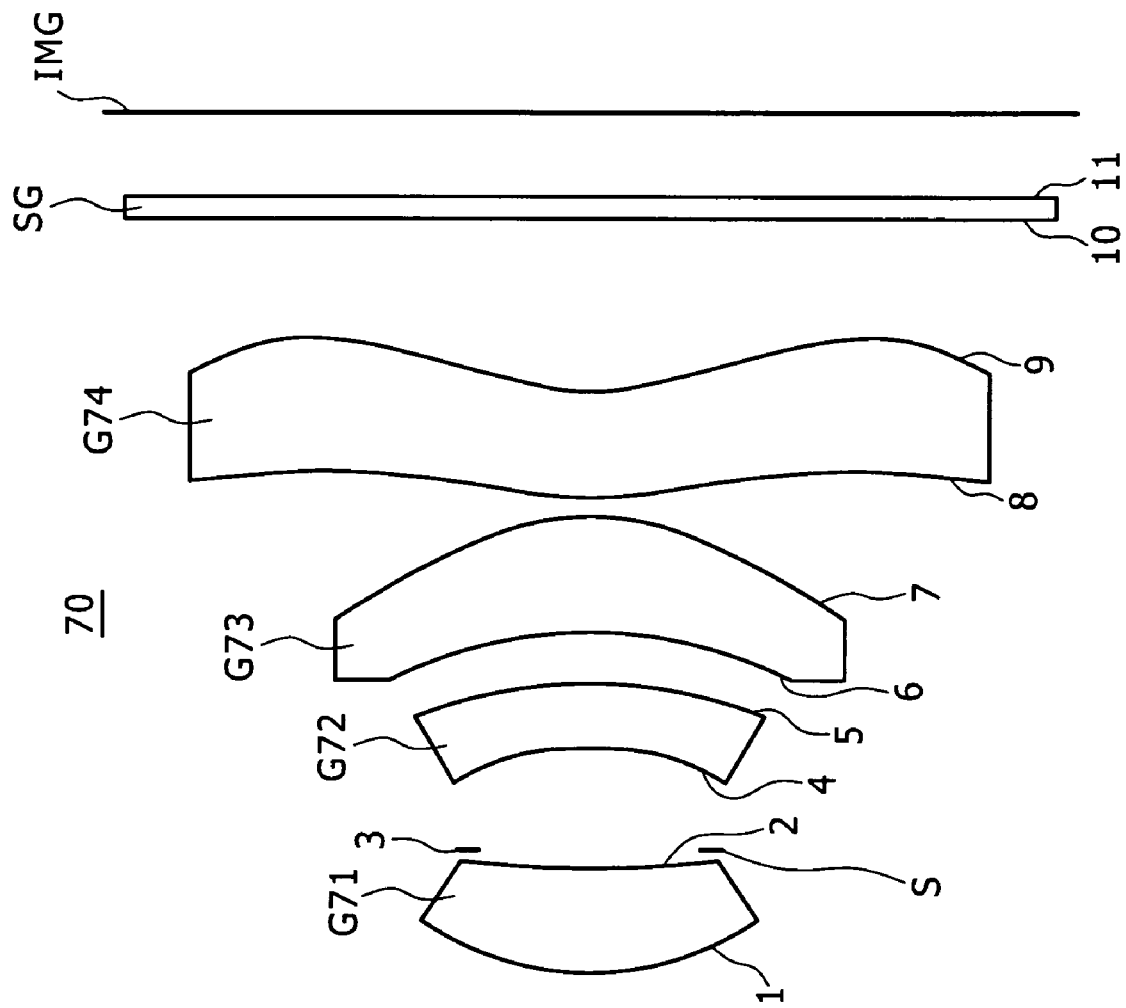
FIG. 13 is a schematic sectional view showing a configuration of an image pickup lens according to a seventh numerical value example of the present invention.

Referring to FIG. 13, there is shown an image pickup lens according to a seventh numerical value example and is generally denoted by 70. Also the image pickup lens 70 shown has a configuration having four lenses.

The image pickup lens 70 includes a first lens G71 of a meniscus shape having a convex face directed to the object side and having a positive refracting power, an aperture stop S, a second lens G72 having a concave face directed to the object side and having a negative refracting power, a third lens G73 having a concave face directed to the object side and having a positive refracting power, and a fourth lens G74 having a convex face directed to the object side and having a negative refracting power, disposed in order from the object side.

Also in the image pickup lens 70, all of the first to fourth lenses G71 to G74 are made of plastics. Particularly, the first lens G71 is made of a polyolefin-based or acrylic-based plastic material; the second lens G72 is made of a polycarbonate-based or polyester-based plastic material; the third lens G73 is made of a polyolefin-based or acrylic-based plastic material; and the fourth lens G74 is made of a polyolefin-based or acrylic-based plastic material.

The image pickup lens 70 having such a configuration as described above has a good optical performance ready for a high pixel number image pickup element of a megapixel resolution or more, and the aperture stop S is disposed between the first and second lenses G71 and G72 without being disposed at the nearest position to the object.

Consequently, the image pickup lens 70 can reduce the fabrication sensitivity in comparison with that in an alternative configuration wherein the aperture stop S is disposed at the nearest position to the object because the height of a location of the first and second lenses G71 and G72 having a high refracting power from the optical axis at which a light flux passes can be set lower.

Further, in the image pickup lens 70, since the aperture stop S is disposed at a position of the optical system as forward as possible, that is, between the first and second lenses G71 and G72, the exit pupil is positioned rather forwardly. Consequently, the overall length of the lens system can be reduced.

In particular, in the image pickup lens 70, since the aperture stop S is disposed between the first and second lenses G71 and G72, the overall length of the lens system can be minimized while reducing the fabrication sensitivity even if it is a little.

Further, in the image pickup lens 70, since the second lens G72 has a shape having the concave face directed to the object side, the incident angle of a light flux to the second lens G72 is small, and consequently, appearance of aberrations caused by widening of the angle of the image pickup lens 70 can be suppressed.

It is to be noted that the image pickup lens 70 further includes a seal glass member SG disposed between the fourth lens G74 and an image plane IMG for protecting the image plane IMG.

In this manner, since the image pickup lens 70 has such a lens element configuration as described above, it can reduce the overall length of the lens system while reducing the fabrication sensitivity and can favorably correct various aberrations caused by widening of the angle.

Table 13 indicates lens data where particular numerical values are applied to the image pickup lens 70 of the seventh numerical value example together with the F number FNo and the focal distance f and the angle 2ω of view of the entire lens system.

TABLE 13

Lens Data of the Seventh Numerical Value Example
FNo = 2.85 f = 4.40 2ω = 65.3°

| Si Face number | Ri Radius of curvature | Di Distance | Ndi Refractive index | Ndi Abbe number |
|---|---|---|---|---|
| 1 (ASP) | 1.580 | 0.67 | 1.553 | 71.7 |
| 2 (ASP) | 5.075 | 0.10 | Air | Air |
| 3 (STOP) | ∞ | 0.64 | Air | Air |
| 4 (ASP) | −2.041 | 0.42 | 1.650 | 12.0 |
| 5 (ASP) | −3.017 | 0.30 | Air | Air |
| 6 (ASP) | −1.640 | 0.75 | 1.523 | 56.0 |
| 7 (ASP) | −1.135 | 0.12 | Air | Air |
| 8 (ASP) | 2.594 | 0.68 | 1.523 | 56.0 |
| 9 (ASP) | 1.276 | 1.07 | Air | Air |
| 10 | ∞ | 0.15 | 1.519 | 64.3 |
| 11 | ∞ | 0.50 | Air | Air |

In the image pickup lens 70, the face R1 of the first lens G71 on the object side, the face R2 of the first lens G71 on the image side, the face R4 of the second lens G72 on the object side, the face R5 of the second lens G72 on the image side, the face R6 of the third lens G73 on the object side, the face R7 of the third lens G73 on the image side, the face R8 of the fourth lens G74 on the object side, and the face R9 of the fourth lens G74 on the image side are formed in aspheric shapes.

The 4th, 6th, 8th, and 10th aspheric coefficients "A," "B," "C," and "D" of the aspheric faces of the image pickup lens 70 in the seventh numerical value example are indicated in Table 14 together with the constant "K" of the cone. It is to be noted that, in Table 14, "E-01" is an exponential representation with base 10, that is, "$10^{-1}$," and for example, "0.12345E-05" represents "$0.12345 \times 10^{-5}$."

Figure 14:
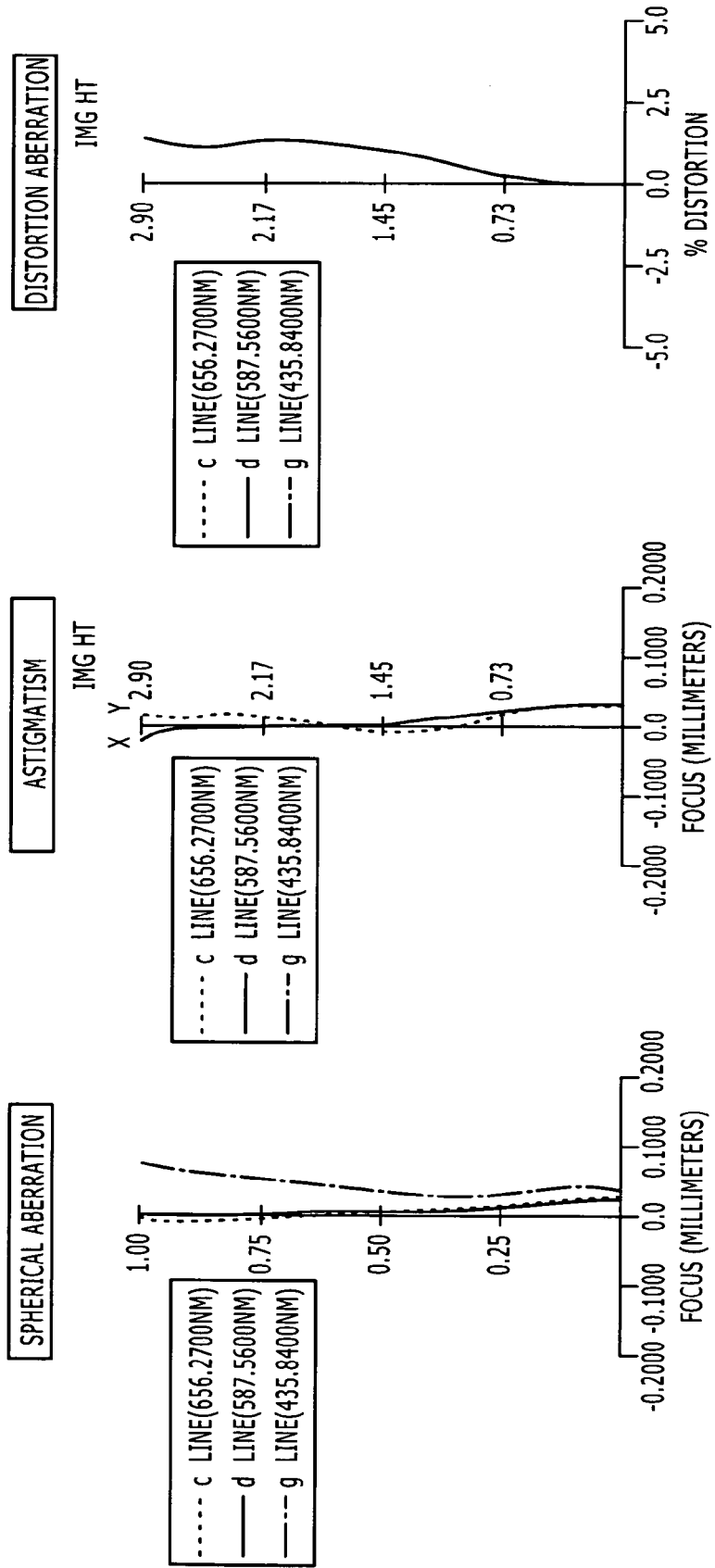
FIG. 14 is a diagrammatic view illustrating characteristic curves of aberrations of the image pickup lens of FIG. 13.

Various aberrations in the image pickup lens 70 of the seventh numerical value example is illustrated in FIG. 14. Referring to FIG. 14, also in the diagram of the astigmatism, a solid line indicates values on a sagittal image plane and a broken line indicates values on a meridional image plane.

From the aberration diagrams shown in FIG. 14 which are a spherical aberration diagram, the astigmatism diagram, and a distortion aberration diagram, it can be recognized that the image pickup lens 70 of the seventh numerical value example is corrected favorably in the aberrations and has a superior image forming performance.

[2-8] Eighth Numerical Value Example

Figure 15:
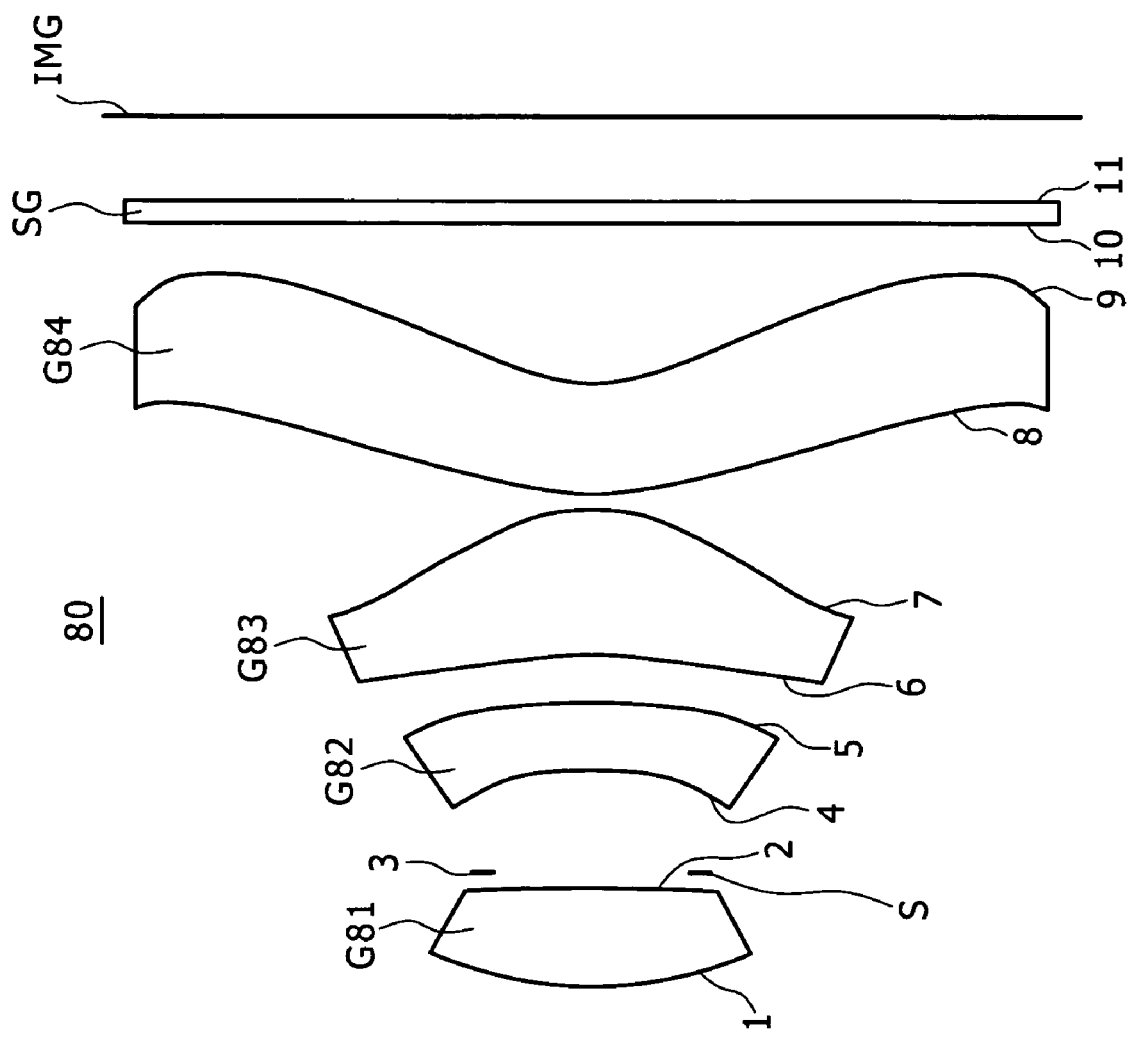
FIG. 15 is a schematic sectional view showing a configuration of an image pickup lens according to an eighth numerical value example of the present invention.

Referring to FIG. 15, there is shown an image pickup lens according to an eighth numerical value example and is generally denoted by 80. Also the image pickup lens 80 shown has a configuration having four lenses.

The image pickup lens 80 includes a first lens G81 of a meniscus shape having a convex face directed to the object side and having a positive refracting power, an aperture stop S, a second lens G82 having a concave face directed to the object side and having a negative refracting power, a third lens G83 having a concave face directed to the object side and having a positive refracting power, and a fourth lens G84 having a convex face directed to the object side and having a negative refracting power, disposed in order from the object side.

Also in the image pickup lens 80, all of the first to fourth lenses G81 to G84 are made of plastics. Particularly, the first lens G81 is made of a polyolefin-based or acrylic-based plastic material; the second lens G82 is made of a polycarbonate-based or polyester-based plastic material; the third lens G83 is made of a polyolefin-based or acrylic-based plastic material; and the fourth lens G84 is made of a polyolefin-based or acrylic-based plastic material.

The image pickup lens 80 having such a configuration as described above has a good optical performance ready for a high pixel number image pickup element of a megapixel resolution or more, and the aperture stop S is disposed between the first and second lenses G81 and G82 without being disposed at the nearest position to the object.

TABLE 14

Aspheric Data in the Seventh Numerical Value Example
FNo = 2.85 f = 4.40 2ω = 65.3°

| Aspheric coefficient | Face number | | | | | | | |
|---|---|---|---|---|---|---|---|---|
| | First Face | Second face | Fourth face | Fifth face | Sixth face | Seventh face | Eighth face | Ninth face |
| K | −0.795 | 0.000 | 0.000 | 0.173 | 0.000 | −3.391 | −2.202 | −6.501 |
| A | 3.270E−02 | −1.854E−02 | −1.134E−01 | 1.133E−04 | 2.258E−01 | −2.712E−02 | −7.389E−02 | −3.431E−02 |
| B | −1.456E−02 | 8.557E−03 | −1.658E−01 | −8.589E−02 | −1.718E−01 | 1.766E−02 | 1.540E−02 | 3.945E−03 |
| C | 3.887E−02 | −1.061E−01 | 2.016E−01 | 6.315E−02 | 7.945E−02 | −9.120E−03 | −1.736E−03 | −5.062E−04 |
| D | −3.533E−02 | 6.017E−02 | −1.472E−01 | 6.474E−03 | −8.773E−03 | 2.322E−03 | 9.395E−05 | 2.915E−05 |

Consequently, the image pickup lens 80 can reduce the fabrication sensitivity in comparison with that in an alternative configuration wherein the aperture stop S is disposed at the nearest position to the object because the height of a location of the first and second lenses G81 and G82 having a high refracting power from the optical axis at which a light flux passes can be set lower.

Further, in the image pickup lens 80, since the aperture stop S is disposed at a position of the optical system as forward as possible, that is, between the first and second lenses G81 and G82, the exit pupil is positioned rather forwardly. Consequently, the overall length of the lens system can be reduced.

In particular, in the image pickup lens 80, since the aperture stop S is disposed between the first and second lenses G81 and G82, the overall length of the lens system can be minimized while reducing the fabrication sensitivity even if it is a little.

Further, in the image pickup lens 80, since the second lens G82 has a shape having the concave face directed to the object side, the incident angle of a light flux to the second lens G82 is small, and consequently, appearance of aberrations caused by widening of the angle of the image pickup lens 80 can be suppressed.

It is to be noted that the image pickup lens 80 further includes a seal glass member SG disposed between the fourth lens G84 and an image plane IMG for protecting the image plane IMG.

In this manner, since the image pickup lens 80 has such a lens element configuration as described above, it can reduce the overall length of the lens system while reducing the fabrication sensitivity and can favorably correct various aberrations caused by widening of the angle.

Table 15 indicates lens data where particular numerical values are applied to the image pickup lens 80 of the eighth numerical value example together with the F number FNo and the focal distance f and the angle 2ω of view of the entire lens system.

TABLE 15

Lens Data of the Eighth Numerical Value Example
FNo = 2.8 f = 3.71 2ω = 74.6°

| Si Face number | Ri Radius of curvature | Di Distance | Ndi Refractive index | Ndi Abbe number |
|---|---|---|---|---|
| 1 (ASP) | 2.005 | 0.59 | 1.523 | 56.0 |
| 2 (ASP) | 17.358 | 0.10 | Air | Air |

TABLE 15-continued

Lens Data of the Eighth Numerical Value Example
FNo = 2.8 f = 3.71 2ω = 74.6°

| Si Face number | Ri Radius of curvature | Di Distance | Ndi Refractive index | Ndi Abbe number |
|---|---|---|---|---|
| 3 (STOP) | ∞ | 0.63 | Air | Air |
| 4 (ASP) | −2.679 | 0.40 | 1.632 | 23.0 |
| 5 (ASP) | −10.746 | 0.30 | Air | Air |
| 6 (ASP) | −2.675 | 0.90 | 1.523 | 56.0 |
| 7 (ASP) | −0.962 | 0.10 | Air | Air |
| 8 (ASP) | 2.054 | 0.68 | 1.523 | 56.0 |
| 9 (ASP) | 0.879 | 0.98 | Air | Air |
| 10 | ∞ | 0.15 | 1.519 | 64.3 |
| 11 | ∞ | 0.50 | Air | Air |

In the image pickup lens 80, the face R1 of the first lens G81 on the object side, the face R2 of the first lens G81 on the image side, the face R4 of the second lens G82 on the object side, the face R5 of the second lens G82 on the image side, the face R6 of the third lens G83 on the object side, the face R7 of the third lens G83 on the image side, the face R8 of the fourth lens G84 on the object side, and the face R9 of the fourth lens G84 on the image side are formed in aspheric shapes.

The 4th, 6th, 8th, and 10th aspheric coefficients "A," "B," "C," and "D" of the aspheric faces of the image pickup lens 80 in the eighth numerical value example are indicated in Table 16 together with the constant "K" of the cone. It is to be noted that, in Table 16, "E-01" is an exponential representation with base 10, that is, "$10^{-1}$," and for example, "0.12345E-05" represents "$0.12345 \times 10^{-5}$."

TABLE 16

Aspheric Data in the Eighth Numerical Value Example
FNo = 2.8 f = 3.71 2ω = 74.6°

| Aspheric coefficient | First Face | Second face | Fourth face | Fifth face | Sixth face | Seventh face | Eighth face | Ninth face |
|---|---|---|---|---|---|---|---|---|
| K | −0.379 | 0.000 | 0.000 | 0.000 | 0.000 | −3.204 | −2.404 | −4.714 |
| A | −4.854E-03 | −3.762E-02 | −1.833E-01 | −5.577E-02 | 1.990E-01 | −4.188E-02 | −4.430E-02 | −1.535E-02 |
| B | −1.182E-02 | −7.831E-02 | −2.191E-01 | −1.199E-01 | −1.756E-01 | 2.903E-02 | 9.302E-03 | 2.928E-04 |
| C | −1.019E-02 | −1.924E-02 | 3.572E-01 | 9.264E-02 | 7.566E-02 | −8.067E-03 | −8.383E-04 | 2.609E-04 |
| D | −2.451E-02 | −6.835E-03 | −2.829E-01 | −1.979E-02 | −1.134E-02 | 1.771E-03 | 1.926E-05 | −3.448E-05 |

Figure 16:
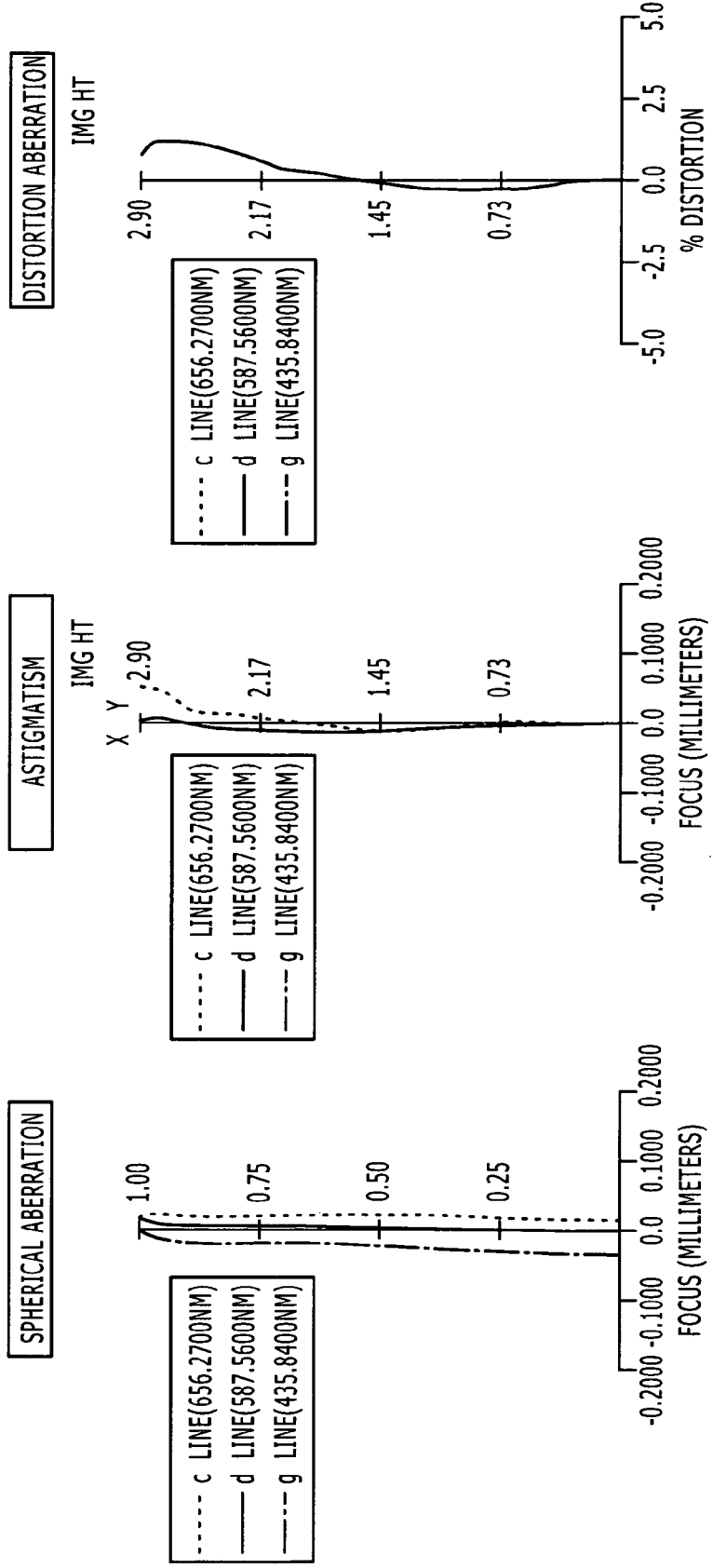
FIG. 16 is a diagrammatic view illustrating characteristic curves of aberrations of the image pickup lens of FIG. 15.

Various aberrations in the image pickup lens 80 of the eighth numerical value example is illustrated in FIG. 16. Referring to FIG. 16, also in the diagram of the astigmatism, a solid line indicates values on a sagittal image plane and a broken line indicates values on a meridional image plane.

From the aberration diagrams shown in FIG. 16 which are a spherical aberration diagram, the astigmatism diagram, and a distortion aberration diagram, it can be recognized that the image pickup lens 80 of the eighth numerical value example is corrected favorably in the aberrations and has a superior image forming performance.

[2-9] Numerical Values Satisfying the Conditional Expressions

Various numerical values of the image pickup lenses 1, 20, 30, 40, 50, 60, 70, and 80 according to the first to eighth numerical examples which satisfy the conditional expressions (1) to (4) given hereinabove are indicated in Table 17.

TABLE 17

Numerical Values Satisfying the Conditional Expressions

| Conditional expression | Example 1 | Example 2 | Example 3 | Example 4 | Example 5 | Example 6 | Example 7 | Example 8 |
|---|---|---|---|---|---|---|---|---|
| $f_2$ | −7.60 | −14.07 | −18.90 | −10.38 | −9.53 | −10000.83 | −11.49 | −5.70 |
| f | 3.71 | 3.71 | 4.40 | 4.58 | 3.71 | 4.00 | 4.40 | 3.71 |
| $f_2/f < -1.5 \ldots (1)$ | −2.05 | −3.79 | −4.30 | −2.27 | −2.57 | −2500.21 | −2.61 | −1.54 |
| $12 < \nu_2 < 28 \ldots (2)$ | 23.0 | 19.4 | 23.0 | 23.0 | 27.0 | 23.0 | 12.0 | 23.0 |
| $f_3$ | 2.26 | 3.50 | 5.11 | 4.68 | 2.80 | 4.04 | 4.57 | 2.39 |
| $0.6 < f_3/f < 1.5 \ldots (3)$ | 0.61 | 0.94 | 1.16 | 1.02 | 0.75 | 1.01 | 1.04 | 0.64 |
| $\nu_4 < 50 \ldots (4)$ | 56 | 56 | 56 | 56 | 56 | 56 | 56 | 56 |

From Table 17, it can be recognized that "$f_2/f$" is "−1.54" even at the highest value as given by the conditional expression (1) and the conditional expression (1) $f_2/f<-1.5$ is satisfied.

Further, according to Table 17, the Abbe numbers $\nu_2$ at the d-line (wavelength: 587.6 nm) of the second lenses G2, G22, G32, G42, G52, G62, G72, and G82 range from the minimum value "12.0" to the maximum value "27.0," and it can be recognized that the conditional expression (2) $12<\nu_2<28$ is satisfied.

Furthermore, according to Table 17, since "$f_3/f$" ranges from the minimum value "0.61" to the maximum value "1.16," it can be recognized that the conditional expression (3) $0.6<f_3/f<1.5$ is satisfied.

Finally, according to Table 17, since the Abbe numbers ν4 at the d-line (wavelength: 587.6 nm) of the fourth lenses G4, G24, G34, G44, G54, G64, G74, and G84 are all "56.0," and it can be recognized that the conditional expression (4) $\nu_4>50$ is satisfied.

Accordingly, the image pickup lenses 1, 20, 30, 40, 50, 60, 70, and 80 according to the first to eighth numerical value examples all satisfy the conditional expressions (1) to (4) given hereinabove.

In this manner, with the image pickup lenses 1, 20, 30, 40, 50, 60, 70, and 80 according to the first to eighth numerical value examples, where they are compared with those disclosed in Patent Document 3 and Patent Document 4 descried hereinabove, the numerical value ranges which satisfy the conditional expressions (1) to (4) are much different.

Consequently, the image pickup lenses 1, 20, 30, 40, 50, 60, 70, and 80 according to the first to eighth numerical value examples can effectively carry out correction of the magnification chromatic aberration, on-axis chromatic aberration, and off-axis aberration, and can have an optical performance sufficient to be ready for a high pixel number image pickup element of a megapixel resolution or more.

[3] Configuration of the Image Pickup Apparatus

Now, an image pickup apparatus which is configured from a combination of an image pickup lens according to an embodiment of the present invention and an image pickup element for converting an optical image formed by the image pickup lens into an electric signal. The image pickup element may be, for example, a CCD (Charge Coupled Device) sensor or a CMOS (Complementary Metal Oxide Semiconductor) sensor.

The image pickup lens provided in the image pickup apparatus includes a first lens of a meniscus shape having a convex face directed to the object side and having a positive refracting power, an aperture stop, a second lens having a concave face directed to the object side and having a negative refracting power, a third lens having a concave face directed to the object side and having a positive refracting power, and a fourth lens having a negative refracting power, disposed in order from the object side.

In the image pickup lens of the image pickup apparatus, all of the first to fourth lenses are made of plastics. Particularly, the first lens is made of a polyolefin-based or acrylic-based plastic material; the second lens is made of a polycarbonate-based or polyester-based plastic material; the third lens is made of a polyolefin-based or acrylic-based plastic material; and the fourth lens is made of a polyolefin-based or acrylic-based plastic material.

The image pickup lens of the image pickup apparatus having such a configuration as described above has a good optical performance ready for a high pixel number image pickup element of a megapixel resolution or more, and the aperture stop is disposed between the first and second lenses without being disposed at the nearest position to the object.

Consequently, the image pickup lens of the image pickup apparatus can reduce the fabrication sensitivity in comparison with that in an alternative configuration wherein the aperture stop is disposed at the nearest position to the object because the height of a location of the lenses from the optical axis at which a light flux passes can be set lower.

Further, in the image pickup lens of the image pickup apparatus, since the aperture stop is disposed at a position of the optical system as forward as possible, that is, between the first and second lenses, the exit pupil is positioned rather forwardly in the image pickup lens. Consequently, the overall length of the lens system can be reduced and hence the entire image pickup apparatus can be reduced in size.

In particular, in the image pickup lens of the image pickup apparatus, since the aperture stop is disposed between the first and second lenses, the overall length of the lens system can be minimized while reducing the fabrication sensitivity even if it is a little. Consequently, the entire image pickup apparatus can be reduced in size.

Further, in the image pickup lens of the image pickup apparatus, since the second lens has a shape having the concave face directed to the object side, the incident angle of a light flux to the second lens is small, and consequently, appearance of aberrations caused by widening of the angle can be suppressed.

Further, the image pickup lens of the image pickup apparatus is configured so as to satisfy the following conditional expressions (1) and (2):

$$f_2/f < -1.5 \qquad (1)$$

$$12 < \nu_2 < 28 \qquad (2)$$

where f: the focal length of the entire lens system, $f_2$: the focal length of the second lens, and $\nu_2$: the Abbe number at the d-line (wavelength: 587.6 nm) of the second lens.

The conditional expression (1) defines the ratio between the focal length f of the entire lens system and the focal length $f_2$ of the second lens and restricts the refracting power of the second lens. In the present image pickup lens, if the ratio comes out of the defined range, then it becomes difficult to correct off-axis aberrations, particularly comatic aberration, and curvature of field.

In this manner, in the image pickup lens of the image pickup apparatus, where the conditional expression (1) is satisfied, aberrations caused by a light flux not in the proximity of the axis but particularly from the outside of the axis can be corrected efficiently.

Further, in the image pickup lens of the image pickup apparatus, in order to achieve reduction of the overall length and widening of the angle of the entire lens system, the power of the second lens is defined as given by the conditional expression (1) to suppress the fabrication sensitivity of the second lens low to some degree.

The conditional expression (2) defines a condition regarding the Abbe number of the second lens, and by setting the Abbe number so as to be included in the conditional range, magnification chromatic aberration and on-axis chromatic aberration caused by widening of the angle are corrected effectively.

Accordingly, in the image pickup lens of the image pickup apparatus, if the Abbe number comes out of the upper limit of the conditional expression (2), then the on-axis chromatic aberration and the magnification chromatic aberration become great. On the contrary, if the Abbe number comes out of the lower limit of the conditional expression (2), then the correction is carried out excessively to increase the on-axis chromatic aberration and the magnification chromatic aberration, resulting in failure to maintain a good optical performance.

In this manner, since the image pickup lens of the image pickup apparatus satisfies the conditional expressions (1) and (2), it can reduce the overall length of the lens system while appearance of aberrations caused by widening of the angle of the lens with respect to a high pixel number image pickup element of a megapixel resolution or more is suppressed. Consequently, the entire image pickup apparatus can be reduced in size.

Further, the image pickup lens of the image pickup apparatus is configured so as to satisfy the following conditional expression (3):

$$0.35 < f_3/f < 1.5 \tag{3}$$

where $f_3$ is the focal distance of the third lens.

The conditional expression (3) defines the power, that is, the refracting power, of the third lens. In the image pickup lens of the image pickup apparatus, if the focal distance of the third lens comes out of the upper limit of the defined range of the conditional expression (3), then the power of the third lens becomes excessively low, resulting in failure to correct aberration caused by the second lens.

Further, in the image pickup lens of the image pickup apparatus, if the focal distance of the third lens comes out of the lower limit of the defined range of the conditional expression (3), then the power of the third lens becomes excessively high. Consequently, also the power of the second lens is raised, and this raises the fabrication sensitivity and makes it impossible to correct comatic aberration, astigmatism, and curvature of field which are caused by the second lens.

Further, the image pickup apparatus is characterized in that at least one of the faces of the first and second lenses of the image pickup lens on the object side and the image side has an aspheric shape and both of the faces of the third and fourth lenses on the object side and the image side have an aspheric shape. Consequently, the image pickup lens of the image pickup apparatus can effectively correct comatic aberration, curvature of field, or distortion aberration which particularly appears outside the axis.

It is to be noted that, in the image pickup lens of the image pickup apparatus, where the opposite faces of the first lens have aspheric shapes, the spherical aberration can be corrected effectively through the first lens. Further, where the opposite faces of the second lens have aspheric shapes, the astigmatism, curvature of field, and comatic aberration can be corrected effectively.

Incidentally, in the image pickup lens, where the opposite faces of the first and second lenses have aspheric shapes, since the difficulty in fabrication increases, preferably only one of the faces on the object side or the image side is formed so as to have an aspheric shape as far as possible.

However, with the image pickup lens, it is ideal to form both faces of the first and second lenses as aspheric faces in order to correct comatic aberration, spherical aberration, astigmatism, curvature of field, and distortion aberration which are caused by widening of the angle of the lens.

Further, the image pickup lens of the image pickup apparatus is configured so as to satisfy the following conditional expression (4):

$$v_4 > 50 \tag{4}$$

where $v_4$ is the Abbe number at the d-line (wavelength: 587.6 nm) of the fourth lens.

The conditional expression (4) defines the Abbe number of the fourth lens, and if the Abbe number of the fourth lens is equal to or lower than the defined value, then the magnification chromatic aberration cannot be corrected.

In this manner, the image pickup lens of the image pickup apparatus satisfies the conditional expressions (3) and (4) so that it can effectively suppress appearance of aberration without raising the fabrication sensitivity.

Thus, according to an embodiment of the present invention, a small-sized image pickup lens can be configured which has a good optical performance ready for a high pixel number image pickup device of a megapixel resolution or more, exhibits little drop of optical performance caused by widening of the angle of view and is reduced in the entire length of the lens system.

[4] Configuration of a Portable Telephone Set in which the Image Pickup Apparatus is Incorporated Now, a portable telephone set in which the image pickup apparatus according to an embodiment of the present invention is incorporated is described.

Figure 17:
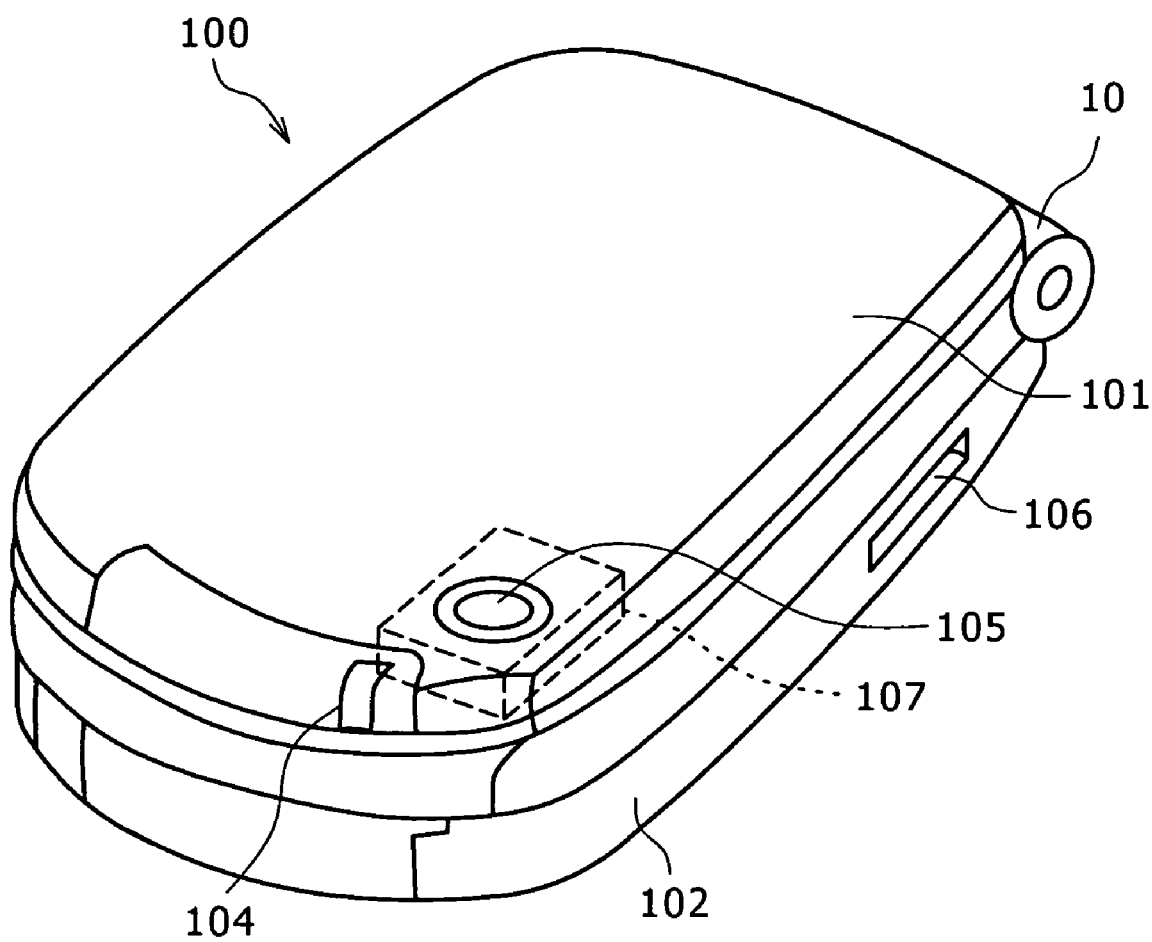
FIGS. 17 and 18 are schematic perspective views showing appearances of a portable telephone set in which an image pickup is incorporated and which is in a folded state and an unfolded state, respectively.
Figure 18:
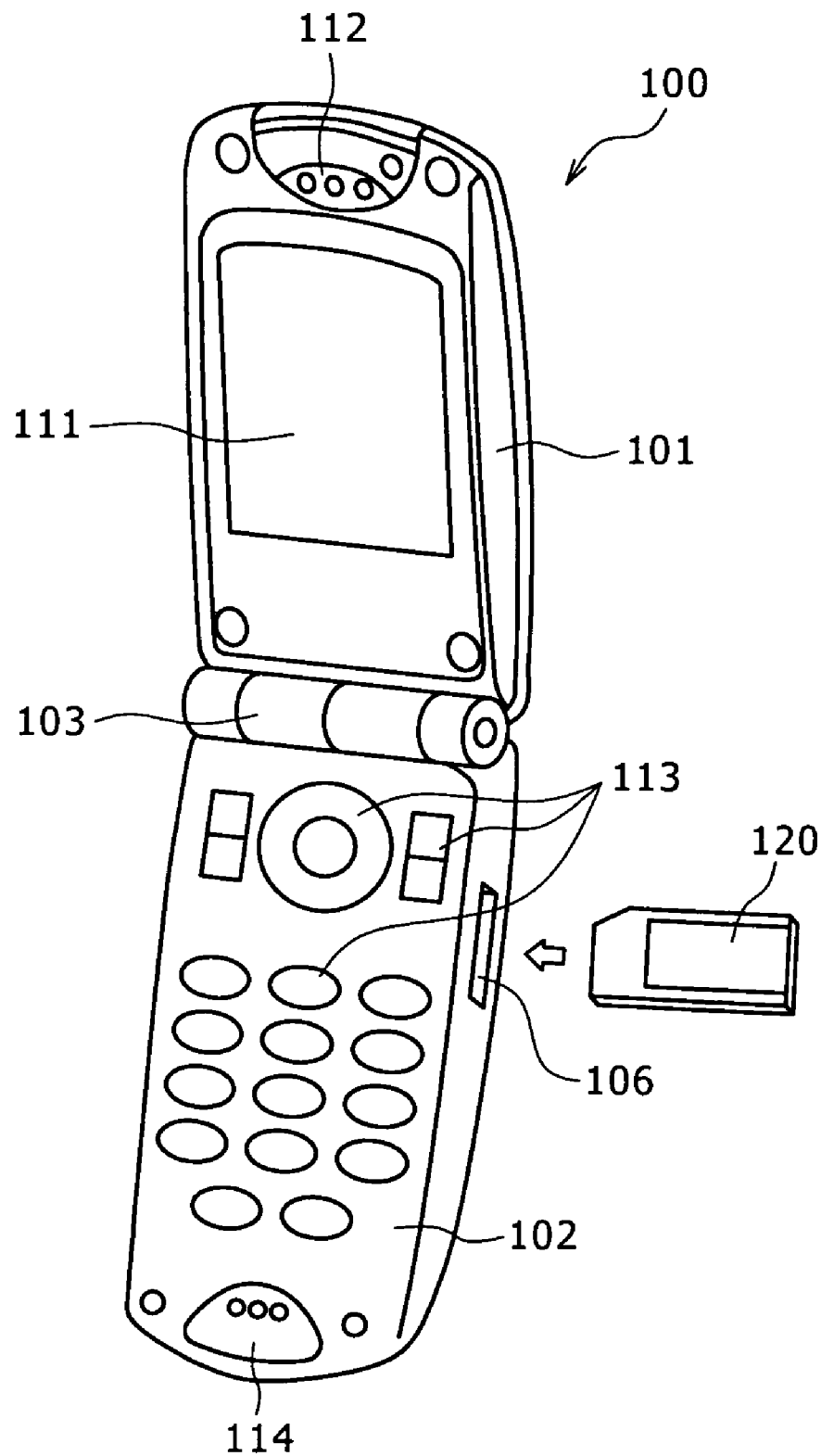

Referring to FIGS. 17 and 18, the portable telephone set 100 shown includes a display section 101 and a body section 102 connected for folding movement through a hinge section 103. When the portable telephone set 100 is to be carried, the display section 101 and the body section 102 are folded on each other as seen in FIG. 17, but when the portable telephone set 100 is to be used for telephone conversation or the like, the display section 101 and the body section 102 are unfolded from each other as seen in FIG. 18.

The display section 101 has a liquid crystal display panel 111 provided on one face thereof and has a speaker 112 provided at an upper portion of the face thereof as seen in FIG. 18. Further, the display section 101 has an image pickup apparatus 107 incorporated in the inside thereof and has an infrared communication section 104 provided at an end thereof for carrying out infrared wireless communication.

Further, the display section 101 has a cover lens 105 provided on the other face thereof and positioned on the object side with respect to the first lens of the image pickup apparatus 107.

The body section 102 has various operation keys 113 such as numeral keys and a power supply key provided on one face thereof and has a microphone 114 provided at a lower end thereof. Further, the body section 102 has a memory card slot 106 provided on a side face thereof such that a memory card 120 is removably inserted into the memory card slot 106.

Referring now to FIG. 19, the portable telephone set 100 includes a central processing unit (CPU) 130, which develops a control program stored in a read only memory (ROM) 131 into a random access memory (RAM) 132 to control the entire portable telephone set 100 through a bus 133.

The portable telephone set 100 includes a camera control section 140 which controls the image pickup apparatus 107 such that the portable telephone set 100 can execute pickup of a still picture or a dynamic picture.

The camera control section 140 carries out a compression working process in accordance with the JPEG (Joint Photographic Experts Group) system, the MPEG (Moving Picture Expert Group) system or a like system for image data obtained by image pickup through the image pickup apparatus 107. The camera control section 140 signals image data obtained by the compression working process to the CPU 130, a display control section 134, a communication control section 160, a memory card interface 170, or an infrared interface 135 through the bus 133.

The image pickup apparatus 107 is formed from a combination of one of the image pickup lenses 1, 20, 30, 40, 50, 60, 70, and 80 and an image pickup element SS which includes a CCD sensor, a CMOS sensor or a like.

In the portable telephone set 100, the CPU 130 temporarily stores image data supplied thereto from the camera control section 140 into the RAM 132 and stores the image data into the memory card 120 through the memory card interface 170 or outputs the image data to the liquid crystal display panel 111 through the display control section 134 as occasion demands.

In the portable telephone set 100, upon image pickup, sound data simultaneously collected through the microphone 114 can be temporarily stored into the RAM 132 through a sound codec 150, or can store the sound data into the memory card 120 through the memory card interface 170 or output the sound data as sound from the speaker 112 through the sound codec 150 simultaneously with image display on the liquid crystal display panel 111 as occasion demands.

It is to be noted that the portable telephone set 100 can output image data or sound data to the outside through the infrared interface 135 and the infrared communication section 104 to transmit the image data or sound data to another electronic apparatus having an infrared communication function such as, for example, a portable telephone set, a personal computer, or a personal digital assistant (PDA).

Incidentally, in the portable telephone set 100, where a dynamic picture or a still picture is displayed on the liquid crystal display panel 111 based on image data stored in the RAM 132 or the memory card 120, the image data is outputted to the liquid crystal display panel 111 through the display control section 134 after decoding, decompression, and other necessary processes of the image data are carried out by the camera control section 140.

The communication control section 160 sends and receives radio waves to and from a base station through an antenna not shown. In the speech communication mode, the communication control section 160 carries out a predetermined process for received sound data and outputs the resulting sound data to the speaker 112 through the sound codec 150.

Further, the communication control section 160 carries out a predetermined process for a sound signal collected by the microphone 114 through the sound codec 150 and sends the resulting sound signal through the antenna not shown.

Since the image pickup apparatus 107 is configured such that any of the image pickup lenses 1, 20, 30, 40, 50, 60, 70, and 80 which are incorporated therein is configured such that the overall length of the lens system can be reduced in comparison with that of related lens systems as described hereinabove, it can be incorporated advantageously into an electronic apparatus for which reduction of the thickness is required such as a portable telephone set.

[5] Other Embodiments

In the embodiment described above, the particular shapes, structures, and numerical values of the components of the image pickup lenses 1, 20, 30, 40, 50, 60, 70, and 80 according to the first to eighth numerical value examples are mere examples in embodying the present invention and the technical scope of the present invention shall not be interpreted restrictively depending upon them.

Further, while, in the embodiments described above, the particular numerical values indicated in Table 17 are used in the first to eighth numerical value examples, the present invention is not limited to them but may use various other shapes, structures and numerical values only within the range within which the conditional expressions (1) to (4) are satisfied.

Furthermore, while, in the foregoing description of the embodiment, the case is described wherein the image pickup lens includes a fourth lens having a convex face directed to the object side and having a negative refracting power, the present invention is not limited to this, but the image pickup lens may use a different fourth lens having a concave face directed to the object side and having a negative refracting power only if the conditional expression (4) is satisfied.

Further, in the embodiment described hereinabove, all of the first to fourth lenses of the image pickup lens according to an embodiment of the present invention are formed from plastics, and the first lens is made of a polyolefin-based or acrylic-based plastic material; the second lens is made of a polycarbonate-based or polyester-based plastic material; the third lens is made of a polyolefin-based or acrylic-based plastic material; and the fourth lens is made of a polyolefin-based or acrylic-based plastic material.

However, the present invention is not limited to this, but all of the first to fourth lenses of the image pickup lens according to the present invention may otherwise be formed from a glass lens having an equal or higher optical performance.

While, as the image pickup lens and the image pickup apparatus according to an embodiment of the present invention, a case wherein the image pickup apparatus 107 is incorporated, for example, in the portable telephone set 100, the subject of application of the image pickup apparatus is not limited to this, but the image pickup apparatus can be applied widely to various other electronic apparatus such as a digital video camera, a digital still camera, a personal computer in which a camera is incorporated, and a PDA in which a camera is incorporated.

The present application contains subject matter related to that disclosed in Japanese Priority Patent Application JP 2008-189891 filed in the Japan Patent Office on Jul. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup lens, comprising:
a first lens having a positive refracting power;
an aperture stop for adjusting the amount of light;
a second lens having a concave face directed to the object side and having a negative refracting power;
a third lens having a concave face directed to the object side and having a positive refracting power; and
a fourth lens having a negative refracting, power;
said first lens, aperture stop, second lens, third lens, and fourth lens being disposed in order from the object side;
said image pickup lens satisfying the following conditional expressions (1) and (2), $$f_2/f < -1.5 \tag{1}$$

$$12 < v_2 < 28 \tag{2}$$

where
f is the focal length of the entire lens system,
$f_2$ is the focal length of said second lens, and
$v_2$ is the Abbe number at the d-line, whose wavelength is 587.6 nm, of said second lens.

2. The image pickup lens according to claim 1, wherein said image pickup lens satisfies the following conditional expression (3):

$$0.6 < f_3/f < 1.5 \tag{3}$$

where
f is the focal length of the entire lens system, and
$f_3$ is the focal distance of the third lens.

3. The image pickup lens according to claim 1, wherein
at least one of the faces of said first and second lenses on the object side and the image side is formed in an aspheric shape, and
both of the faces of said third and fourth lenses on the object side and the image side are formed in an aspheric shape.

4. The image pickup lens according to claim 1, wherein said fourth lens satisfies the following conditional expression (4):

$$v_4 > 50 \tag{4}$$

where
$v_4$ is the Abbe number at the d-line, whose wavelength is 587.6 nm, of said fourth lens.

5. An image pickup apparatus, comprising:
an image pickup lens; and
an image pickup element for converting an optical image formed by said image pickup lens into an electric signal;
said image pickup lens including
a first lens having a positive refracting power,
an aperture stop for adjusting the amount of light,
a second lens having a concave face directed to the object side and having a negative refracting power,
a third lens having a concave face directed to the object side and having a positive refracting power, and
a fourth lens having a negative refracting power,
said first lens, aperture stop, second lens, third lens and fourth lens being disposed in order from the object side;
said image pickup lens satisfying the following conditional expressions (1) and (2), $$f_2/f < -1.5 \tag{1}$$

$$12 < v_2 < 28 \tag{2}$$

where
f is the focal length of the entire lens system,
$f_2$ is the focal length of said second lens, and
$v_2$ is the Abbe number at the d-line, whose wavelength is 587.6 nm, of said second lens.

* * * * *